(12) United States Patent
Kurihashi

(10) Patent No.: US 11,485,349 B2
(45) Date of Patent: *Nov. 1, 2022

(54) CONTROL DEVICE FOR A HYBRID VEHICLE

(71) Applicant: TOYOTA JIDOSHA KABUSHIKI KAISHA, Toyota (JP)

(72) Inventor: Sui Kurihashi, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 466 days.

This patent is subject to a terminal disclaimer.

(21) Appl. No.: 16/535,167

(22) Filed: Aug. 8, 2019

(65) Prior Publication Data

US 2020/0094812 A1 Mar. 26, 2020

(30) Foreign Application Priority Data

Sep. 21, 2018 (JP) .............................. JP2018-178027

(51) Int. Cl.
  *B60W 20/12* (2016.01)
  *B60K 6/28* (2007.10)
  (Continued)

(52) U.S. Cl.
  CPC .............. *B60W 20/12* (2016.01); *B60K 6/28* (2013.01); *B60K 6/42* (2013.01); *B60W 10/06* (2013.01);
  (Continued)

(58) Field of Classification Search
  CPC ...... B60W 20/12; B60W 10/06; B60W 10/08; B60W 510/244; B60W 2552/00;
  (Continued)

(56) References Cited

U.S. PATENT DOCUMENTS 10,118,606 B2    11/2018  Ogawa
2008/0305922 A1*  12/2008  Hoffmann ................ B60K 6/48
                                                        477/3

(Continued)

FOREIGN PATENT DOCUMENTS

CN        104071150 A    10/2014
CN        105674994 A     6/2016
(Continued)

OTHER PUBLICATIONS

Translation of JP 2016113946 (Year: 2016).*
(Continued)

*Primary Examiner* — Sze-Hon Kong
*Assistant Examiner* — Daniel Tyler Reich
(74) *Attorney, Agent, or Firm* — Oliff PLC

(57) ABSTRACT

A control device for a vehicle includes a catalyst temperature raising control part configured to perform catalyst temperature raising control raising a temperature of an exhaust purification catalyst of an internal combustion engine while driving in an EV mode on an EV section of a driving route when driving over the driving route in accordance with a driving plan when, while driving on the EV section: (i) the temperature of the exhaust purification catalyst is less than a predetermined temperature raising reference temperature that is higher than an activation temperature at which an exhaust purification function of the exhaust purification catalyst is activated, (ii) the exhaust purification catalyst was previously heated while driving on the driving route, and (iii) there is a CS section to be driven on while in a CS mode in a remaining driving section of the driving route after the EV section.

6 Claims, 27 Drawing Sheets

(51) Int. Cl.
*B60K 6/42* (2007.10)
*B60W 10/06* (2006.01)
*B60W 10/08* (2006.01)
*F01N 3/20* (2006.01)

(52) U.S. Cl.
CPC ........... *B60W 10/08* (2013.01); *F01N 3/2033* (2013.01); *B60W 2510/244* (2013.01); *B60W 2552/00* (2020.02); *B60W 2710/0694* (2013.01); *B60W 2710/08* (2013.01); *B60Y 2200/92* (2013.01)

(58) Field of Classification Search
CPC ..... B60W 2710/0694; B60W 2710/08; B60W 50/0097; B60W 2510/068; B60W 2510/0685; B60W 2540/06; B60W 2556/50; B60W 10/26; B60W 20/16; B60W 20/15; B60W 20/20; B60W 2540/10; B60K 6/28; B60K 6/42; B60K 6/445; F01N 3/2033; B60Y 2200/92; Y02T 10/40; Y02T 10/62
See application file for complete search history.

(56) References Cited

U.S. PATENT DOCUMENTS

| | | | |
|---|---|---|---|
| 2010/0043414 A1* | 2/2010 | Hirose | B60W 20/15 903/904 |
| 2012/0150374 A1* | 6/2012 | Yamazaki | B60W 10/06 180/65.265 |
| 2014/0288743 A1 | 9/2014 | Hokoi et al. | |
| 2015/0298687 A1* | 10/2015 | Kanno | F02D 41/0245 903/905 |
| 2017/0043761 A1 | 2/2017 | Morisaki | |
| 2017/0066431 A1* | 3/2017 | Kim | B60W 10/08 |
| 2019/0270443 A1* | 9/2019 | Kurihashi | B60W 20/12 |
| 2020/0182118 A1* | 6/2020 | Yokoi | F01N 3/2006 |

FOREIGN PATENT DOCUMENTS

| | | | |
|---|---|---|---|
| CN | 106232447 A | | 12/2016 |
| CN | 107387213 A | | 11/2017 |
| EP | 2808218 A1 | | 12/2014 |
| EP | 2910444 A1 | | 8/2015 |
| JP | 2012-111381 A | | 6/2012 |
| JP | 2013-159214 A | | 8/2013 |
| JP | 2014080190 A | * | 5/2014 |
| JP | 2014-162261 A | | 9/2014 |
| JP | 2016-008517 A | | 1/2016 |
| JP | 2016-088128 A | | 5/2016 |
| JP | 2016113946 A | * | 6/2016 |
| JP | 2016-196256 A | | 11/2016 |
| WO | 2011/024038 A2 | | 3/2011 |
| WO | 2015/045261 A1 | | 4/2015 |
| WO | 2015/124983 A1 | | 8/2015 |
| WO | 2015/162474 A1 | | 10/2015 |

OTHER PUBLICATIONS

Translation of JP 2014080190 (Year: 2014).*
U.S. Appl. No. 16/284,018, filed Feb. 25, 2019 in the name of Kurihashi et al.
Mar. 19, 2021 Office Action issued in U.S. Appl. No. 16/284,018.
Aug. 30, 2021 Office Action issued in U.S. Appl. No. 16/284,018.

* cited by examiner

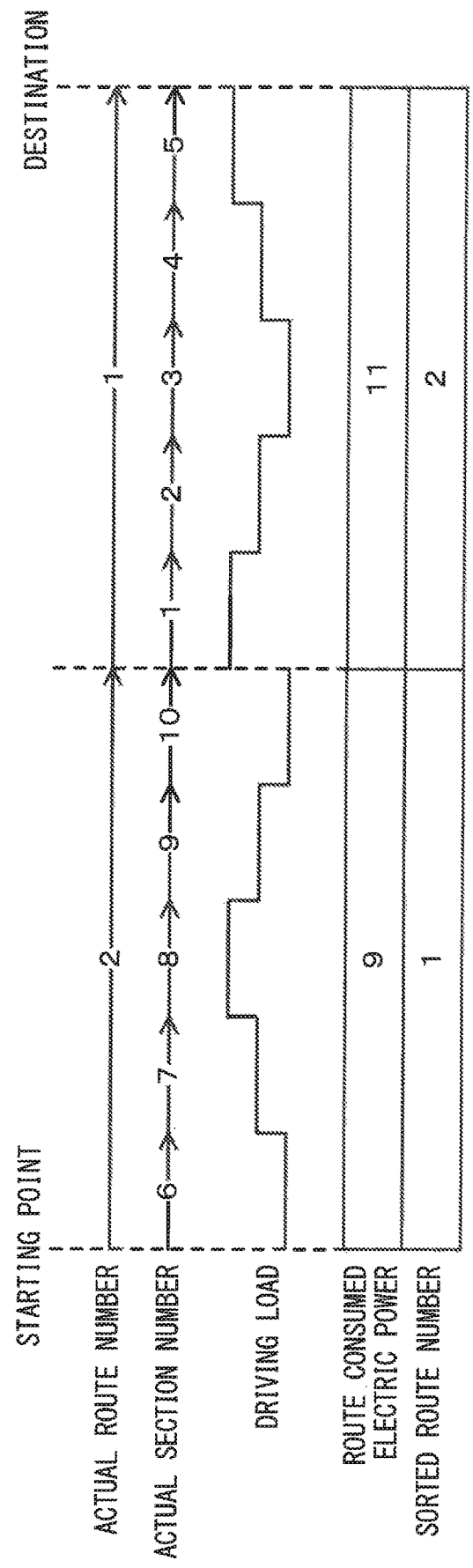

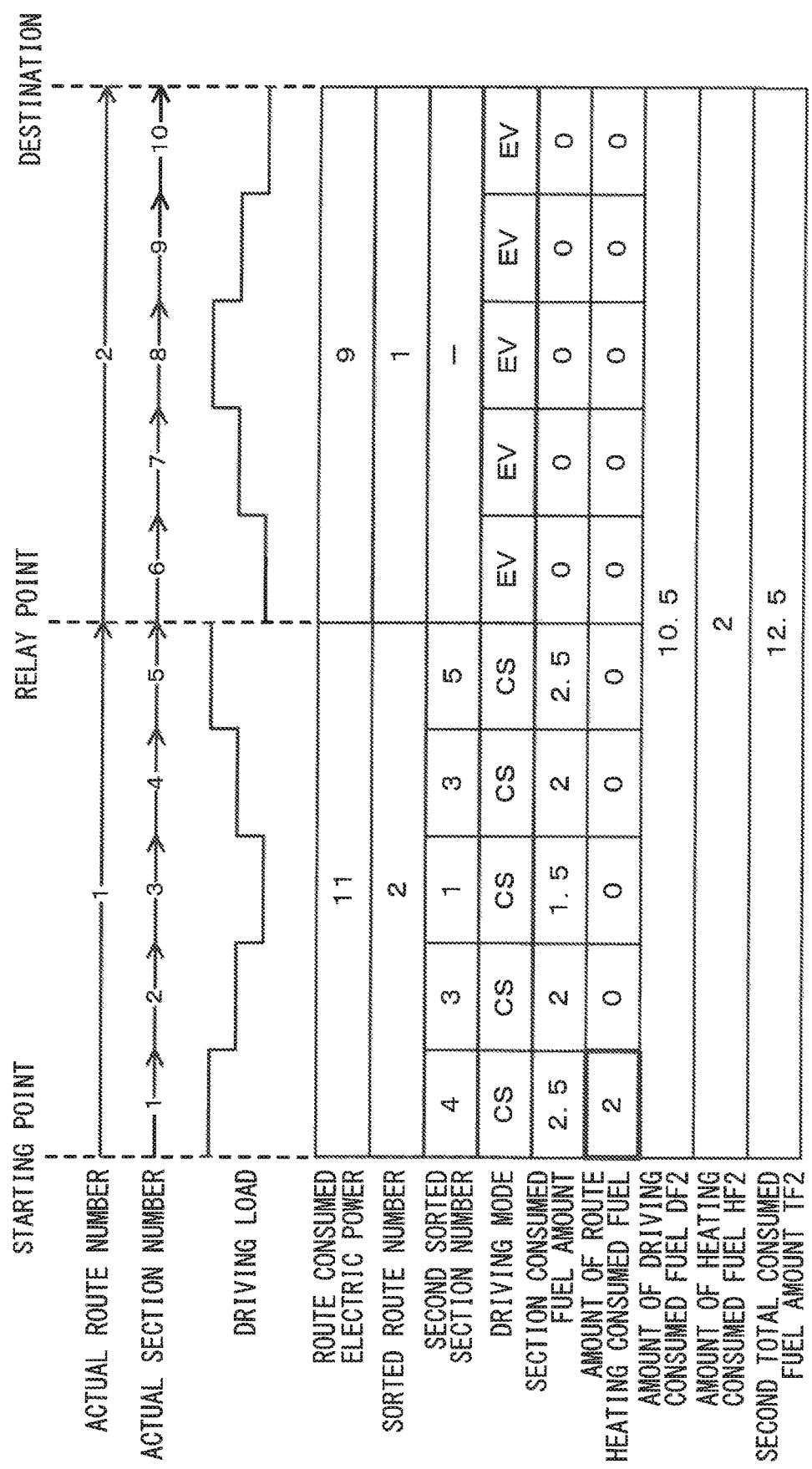

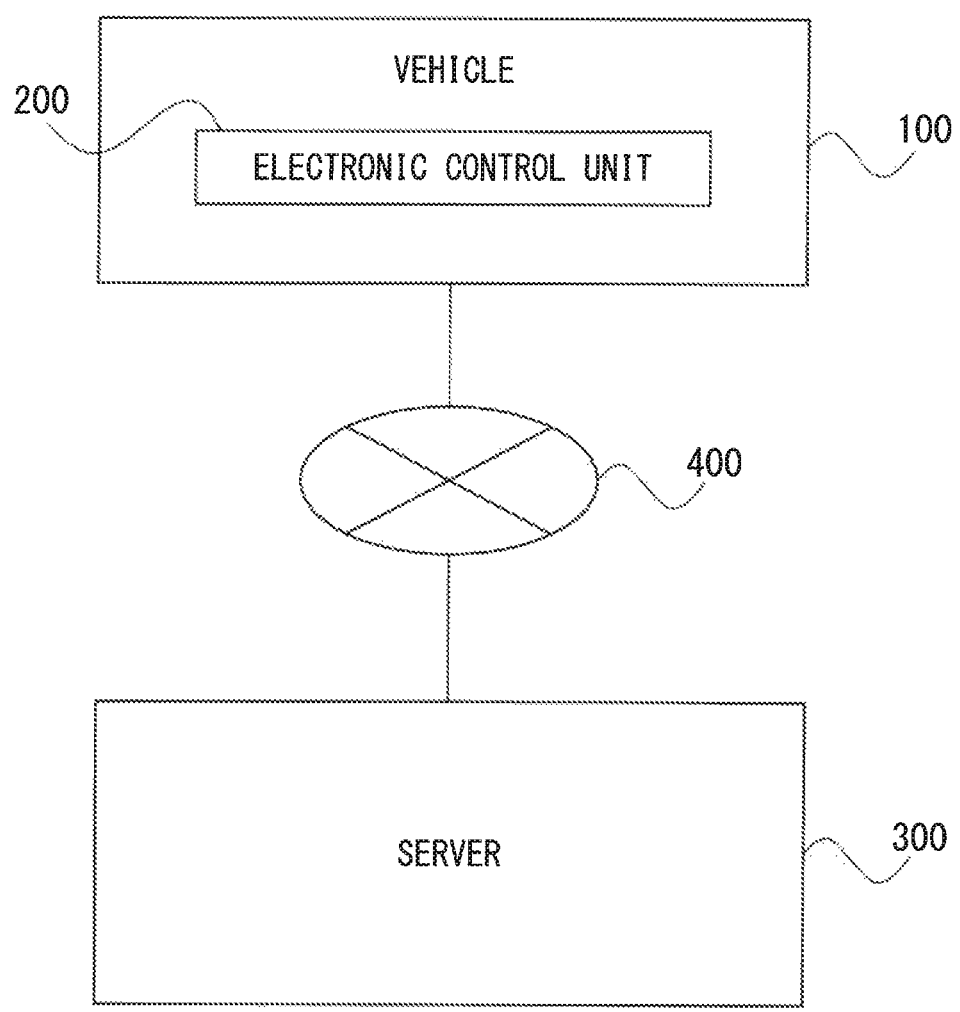

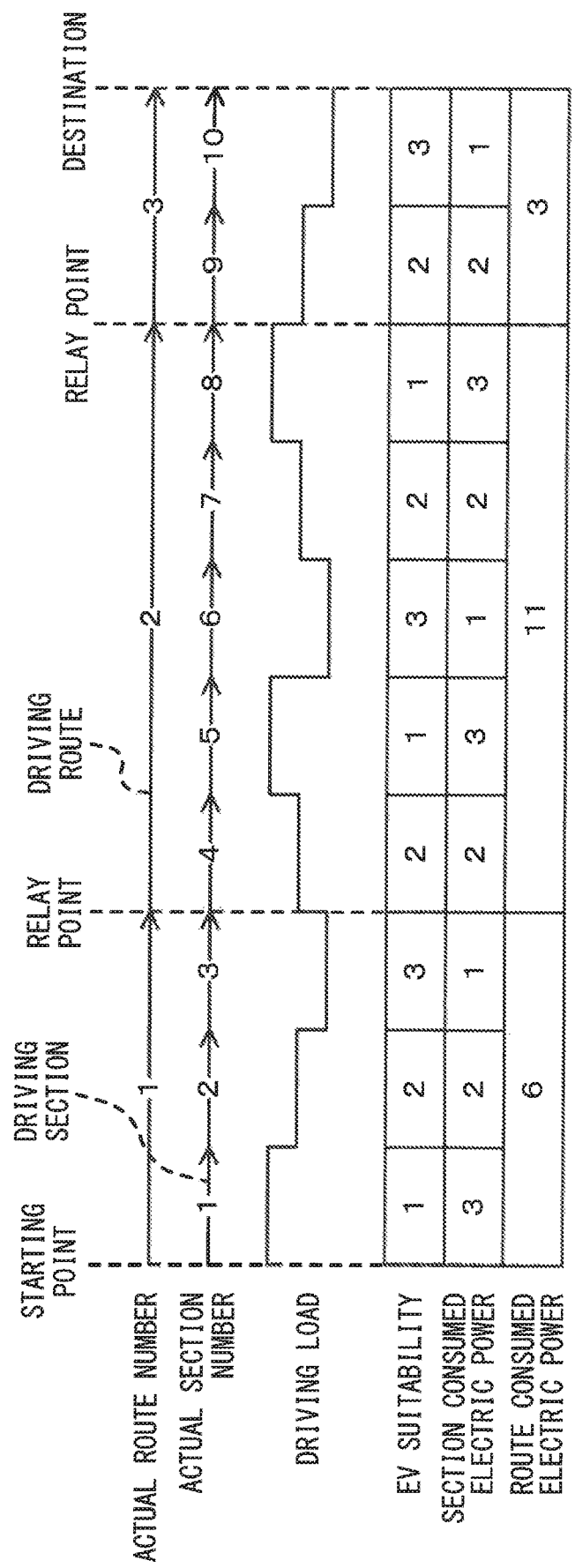

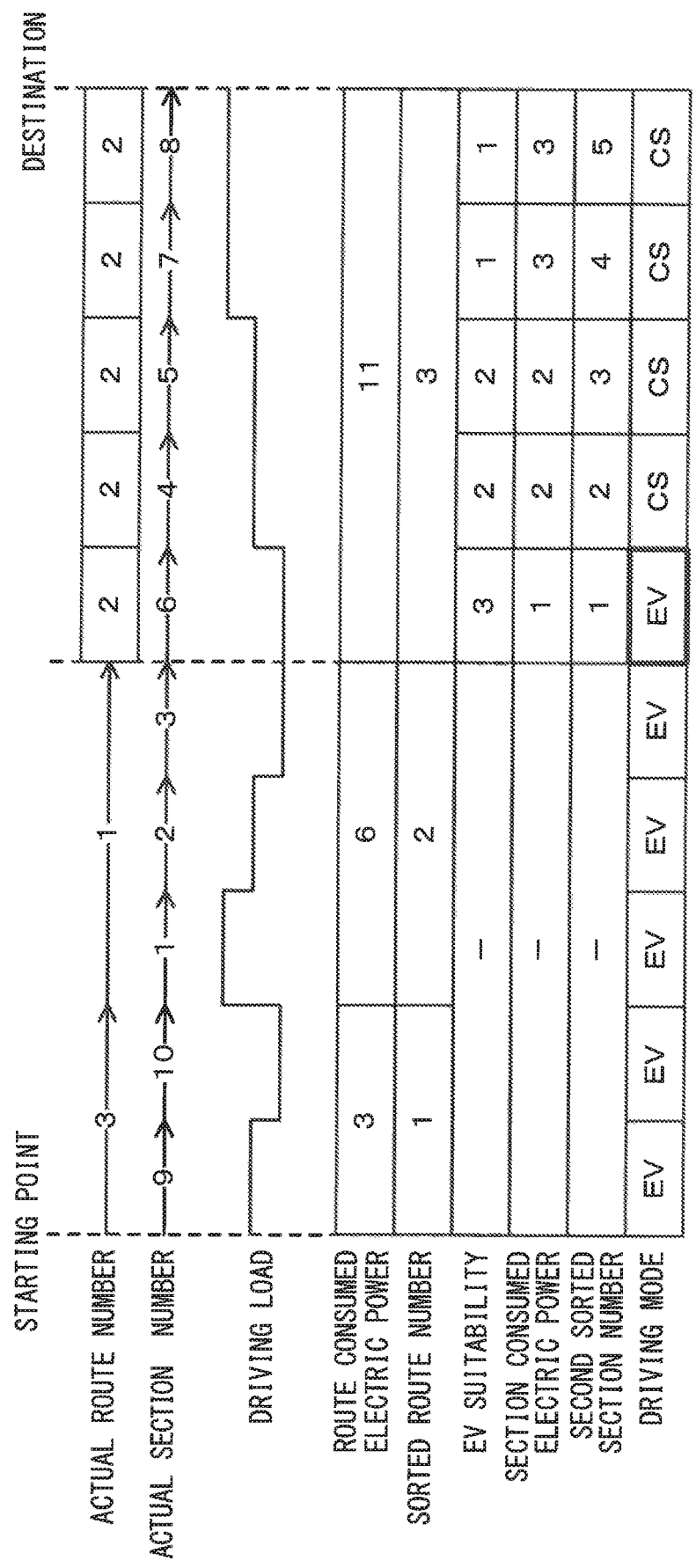

CONTROL DEVICE FOR A HYBRID VEHICLE

FIELD

The present disclosure relates to a control device for a hybrid vehicle.

BACKGROUND

Japanese Unexamined Patent Publication No. 2016-8517 discloses a conventional control device for a hybrid vehicle configured to predict an operating state of an internal combustion engine at a predicted route to a destination and a catalyst temperature and, when it is predicted that a catalyst temperature will become a lower limit temperature or less at a driving section where it is predicted that the internal combustion engine will be stopped, to change operating conditions of the internal combustion engine to a high load side from usual operating conditions at the time of operation of the internal combustion engine before that driving section.

SUMMARY

However, in the control device for a hybrid vehicle described in Japanese Unexamined Patent Publication No. 2016-8517, even if not necessary to operate the internal combustion engine after a driving section where it is predicted that the internal combustion engine will be stopped, when it is predicted that the catalyst temperature will become the lower limit temperature or less at that driving section, the internal combustion engine will be operated at a higher load side from usual at the time of operation of the internal combustion engine before that driving section, so the fuel efficiency is liable to deteriorate.

The present disclosure was made focusing on such a problem and has as its object to keep the catalyst temperature from ending up being made to unnecessarily rise and to keep the fuel efficiency from deteriorating.

To solve this problem, according to one aspect of the present disclosure, there is provided a control device for a hybrid vehicle. The hybrid vehicle comprises an internal combustion engine, a rechargeable battery, and a rotary electric machine driven by electric power of the battery. The control device comprises a driving plan preparing part configured to prepare a driving plan dividing a driving route into a plurality of driving sections and setting whether to drive over each driving section by either a driving mode of an EV mode controlling the output of the rotary electric machine based on the driving load to operate the hybrid vehicle or a CS mode controlling the output of the internal combustion engine and the rotary electric machine based on the state of charge of the battery and the driving load to operate the hybrid vehicle, a driving mode switching part configured to switch the driving mode in accordance with the driving plan, and a catalyst temperature raising control part configured to perform catalyst temperature raising control making a temperature of the exhaust purification catalyst of the internal combustion engine rise. The catalyst temperature raising control part is configured so as to perform the catalyst temperature raising control when the temperature of the exhaust purification catalyst is less than a predetermined temperature raising reference temperature higher than an activation temperature where the exhaust purification function of the exhaust purification catalyst is activated if when driving over a driving route in accordance with a driving plan, the exhaust purification catalyst was already heated on the driving route when driving over an EV section driven on by the EV mode and there is a CS section driven on by the CS mode in the remaining driving sections on the driving route.

According to this aspect of the present disclosure, it is possible to keep the catalyst temperature from ending up being unnecessarily raised, so it is possible to keep the fuel efficiency from deteriorating.

BRIEF DESCRIPTION OF DRAWINGS

FIG. 5B is a view explaining preparation of a second driving plan according to the first embodiment of the present disclosure optimizing a plurality of trips while considering an amount of fuel consumption for heating a catalyst.

FIG. 5E is a view explaining preparation of a second driving plan according to the first embodiment of the present disclosure optimizing a plurality of trips while considering an amount of fuel consumption for heating a catalyst.

FIG. 12 is a block diagram schematically showing the configuration of a vehicle and a control device controlling the vehicle according to a third embodiment of the present disclosure.

FIG. 13A is a view explaining preparation of a second driving plan according to a modification of the present disclosure optimizing a plurality of trips while considering an amount of fuel consumption for heating a catalyst.

FIG. 13C is a view explaining preparation of a second driving plan according to a modification of the present disclosure optimizing a plurality of trips while considering an amount of fuel consumption for heating a catalyst.

DESCRIPTION OF EMBODIMENTS

Figure 1:
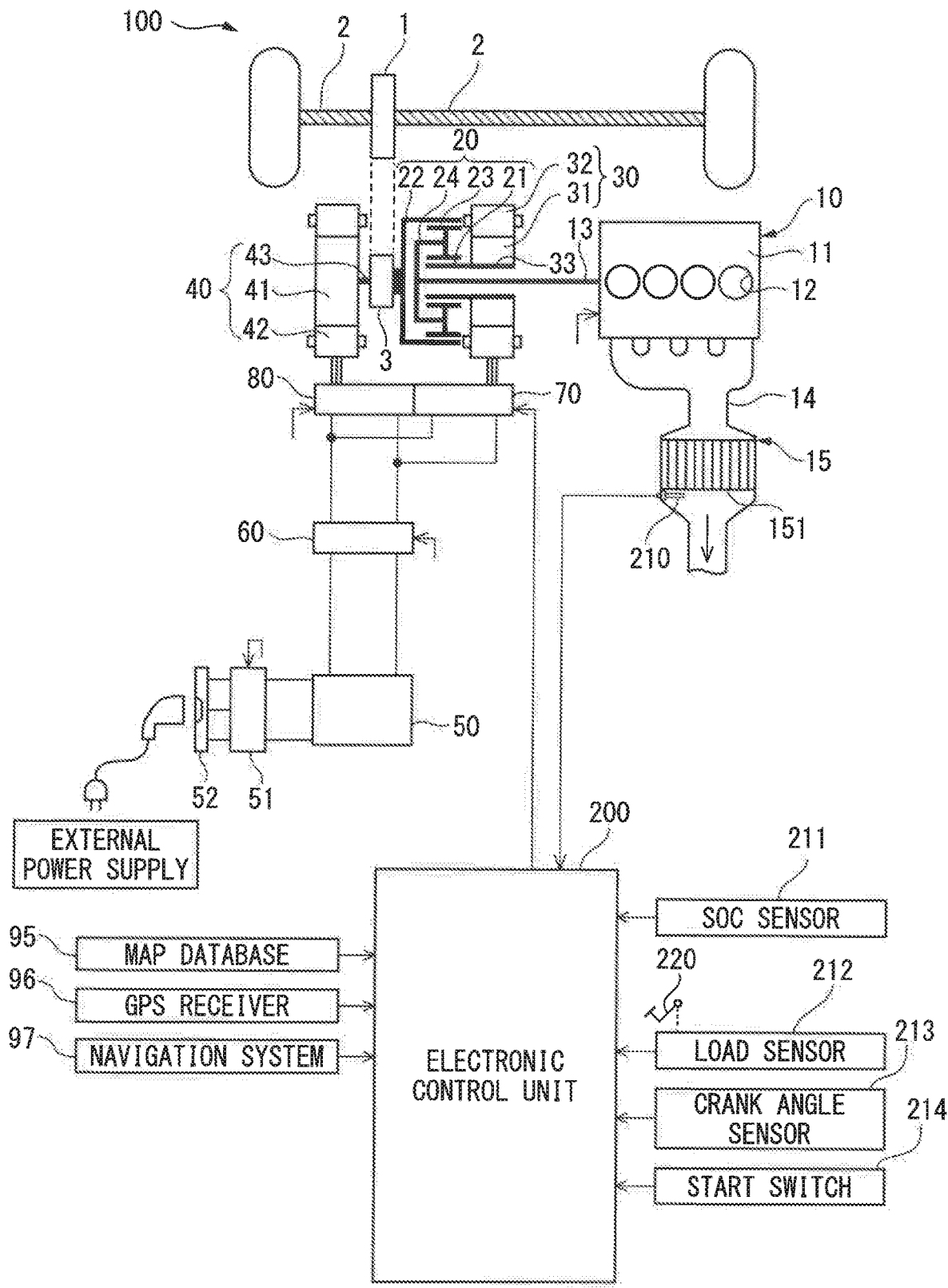
FIG. 1 is a schematic view of the configuration of a vehicle and an electronic control. unit controlling the vehicle according to a first embodiment of the present disclosure.

Below, referring to the drawings, embodiments of the present disclosure will be explained in detail. Note that, in the following explanation, similar component elements are assigned the same reference numerals.

First Embodiment

FIG. 1 is a schematic view of the configuration of a vehicle 100 and an electronic control unit 200 configured to control the vehicle 100 according to a first embodiment of the present disclosure.

The vehicle 100 according to the present embodiment is a hybrid vehicle provided with an internal combustion engine 10, power dividing mechanism 20, first rotary electrical machine 30, second rotary electrical machine 40, battery 50, boost converter 60, first inverter 70, and second inverter 80 and is configured to be able to transmit the power of one or both of the internal combustion engine 10 and second rotary electric machine 40 through a final reduction gear 1 to wheel drive shaft 2. Further, the vehicle 100 is provided with, in addition to the internal combustion engine 10, a map database 95, GPS receiver 96, and navigation system 97.

The internal combustion engine 10 makes fuel burn inside a cylinder 12 formed in an engine body 11 to cause generation of power for making an output shaft 13 connected with a crankshaft rotate. Exhaust discharged from the cylinder 12 to an exhaust passage 14 flows through the exhaust passage 14 and is discharged into the atmosphere. At the exhaust passage 14, a catalyst device 15 is provided for removing harmful substances from the exhaust. The catalyst device 15 is, for example, comprised of a honeycomb shaped substrate 151 carrying an oxidation catalyst or three-way catalyst or other catalyst having an exhaust purification function (exhaust purification catalyst) on its surface. Downstream of the substrate 151, a catalyst temperature sensor 210 is provided for detecting the catalyst temperature.

The power dividing mechanism 20 is a planetary gear for dividing the power of the internal combustion engine 10 into two systems of the power for turning the wheel drive shaft 2 and power for driving the first rotary electrical machine 30 in a regeneration mode and is provided with a sun gear 21, ring gear 22, pinion gears 23, and a planetary carrier 24.

The sun gear 21 is an external gear and is arranged at the center of the power dividing mechanism 20. The sun gear 21 is connected with a shaft 33 of the first rotary electrical machine 30.

The ring gear 22 is an internal gear and is arranged around the sun gear 21 so as to become concentric with the sun gear 21. The ring gear 22 is connected with a shaft 33 of the second rotary electrical machine 40. Further, the ring gear 22 has integrally attached to it a drive gear 3 for transmitting rotation of the ring gear 22 to the wheel drive shaft 2 through the final deceleration device 1.

A pinion gear 23 is an external gear. A plurality of pinion gear 23 are arranged between the sun gear 21 and ring gear 22 so as to mesh with the sun gear 21 and ring gear 22.

The planetary carrier 24 is connected to the output shaft 13 of the internal combustion engine 10 and rotates about the output shaft 13. Further, the planetary carrier 24 is also connected to the pinion gears 23 so as to enable the pinion gears 23 to revolve (orbit) around the sun gear 21 while individually rotating on their axes when the planetary carrier 24 rotates.

The first rotary electrical machine 30 is, for example, a three-phase AC synchronous type motor-generator and is provided with a rotor 31 attached to the outer circumference of the shaft 33 coupled with the sun gear 21 and having a plurality of permanent magnets embedded in its outer circumference and a stator 32 around which is wound an excitation coil generating a rotating magnetic field. The first rotary electrical machine 30 has the function of a motor receiving the supply of power from the battery 50 and being driven in a power running mode and the function of a generator receiving power from the internal combustion engine 10 and being driven in a regeneration mode.

In the present embodiment, the first rotary electrical machine 30 is mainly used as a generator. Further, when making the output shaft 13 rotate for cranking at the time of startup of the internal combustion engine 10, it is used as a motor and plays the role of a starter.

The second rotary electrical machine 40 is, for example, a three-phase AC synchronous type motor-generator. It is provided with a rotor 41 attached to the outer circumference of the shaft 43 connected to the ring gear 22 and having a plurality of permanent magnets embedded in its outer circumferential part and with a stator 42 around which an excitation coil generating a rotating magnetic field is wound. The second rotary electrical machine 40 has the function as a motor receiving the supply of power from a battery 50 and being driven in a power running mode and the function as a generator receiving power from the wheel drive shaft 2 and being driven in a regeneration mode at the time of deceleration of the vehicle etc.

The battery 50 is, for example, a nickel-cadmium storage battery or nickel-hydrogen storage battery, lithium ion battery, or other rechargeable secondary battery. In the present embodiment, as the battery 50, a lithium ion secondary battery with a rated voltage of 200V or so is used. The battery 50 is electrically connected through a boost converter 60 etc. to the first rotary electrical machine 30 and second rotary electrical machine 40 so as to enable charged power of the battery 50 to be supplied to the first rotary electrical machine 30 and second rotary electrical machine 40 and drive them in the power running mode and, further, so as to enable the generated power of the first rotary electrical machine 30 and second rotary electrical machine 40 to charge the battery 50.

Furthermore, the battery 50 is, for example, configured to be able to be electrically connected to an external power supply through a charging control circuit 51 and a charging lid 52 so that charging from a household power outlet or other external power supply becomes possible. The vehicle 100 according to the present embodiment is made a so-called "plug-in hybrid vehicle". The charging control circuit 51 is an electrical circuit able to convert AC current supplied from the external power supply to DC current based on a control signal from the electronic control unit 200 and boost the input voltage to the battery voltage to charge the electric power of the external power supply to the battery 50.

The boost converter 60 is provided with an electrical circuit boosting the terminal voltage of the primary side terminal and outputting it from the secondary side terminal based on a control signal from the electronic control unit 200 and conversely lowering the terminal voltage of the secondary side terminal and outputting it from the primary side terminal based on a control signal from the electronic control unit 200. The primary side terminal of the boost converter 60 is connected to the output terminal of the battery 50, while the secondary side terminal is connected to the DC side terminals of the first inverter 70 and second inverter 80.

The first inverter 70 and second inverter 80 are provided with electrical circuits enabling them to convert direct currents input from the DC side terminals to alternating currents (in the present embodiment, three-phase alternating currents) and output them from the AC side terminals based on a control signal from the electronic control unit 200 and conversely to convert alternating currents input from the AC side terminals to direct currents and output them from the DC side terminals based on a control signal of the electronic control unit 200. The DC side terminal of the first inverter 70 is connected to the secondary side terminal of the boost converter 60, while the AC side terminal of the first inverter 70 is connected to the input/output terminal of the first rotary electrical machine 30. The DC side terminal of the second inverter 80 is connected to the secondary side terminal of the boost converter 60, while the AC side terminal of the second inverter 80 is connected to the input/output terminal of the second rotary electrical machine 40.

The map database 95 is a database relating to the map information. This map database 95, for example, is stored in a hard disk drive (HDD) mounted in the vehicle. The map information contains positional information of the roads and information on the road shape (for example, gradients, types of curves/straight parts, curvatures of the curves, etc.), positional information of intersections and branching points, road types, speed limits, and various other road information.

The GPS receiver 96 receives signals from three or more GPS satellites to identify a longitude and latitude of the vehicle 100 and detect a current position of the vehicle 100. The GPS receiver 96 transmits the detected current position information of the vehicle 100 to the electronic control unit 200.

The navigation system 97 sets a projected route of the vehicle based on the current position information of the vehicle 100 detected by the UPS receiver 96 or map information of the map database 95, destination which the driver sets, etc. and transmits information relating to the set projected route as navigation information to the electronic control unit 200.

The electronic control unit 200 is a microcomputer provided with components connected with each other by a bidirectional bus such as a central processing unit (CPU), read only memory (ROM), random access memory (RAM), input port, and output port.

The electronic control unit 200 receives as input output signals from various sensors such as an SOC sensor 211 detecting the battery charging amount or a load sensor 212 generating an output voltage proportional to an amount of depression of an accelerator pedal 220, crank angle sensor 213 generating as a signal for calculating the engine rotational speed etc. an output pulse each time a crankshaft of the engine body 11 rotates by for example 15°, and a start switch 214 for judging starting and stopping of the vehicle 100.

The electronic control unit 200 drives the control components to control the vehicle 100 based on the output signals of the various sensors which are input etc. Below, the control of the vehicle 100 according to the present embodiment which the electronic control unit 200 performs will be explained.

The electronic control unit 200 switches the driving mode to either of an EV (electric vehicle) mode or a CS (charge sustaining) mode to drive the vehicle 100.

The EV mode is a mode utilizing the charged power of the battery 50 on a priority basis to drive powered operation of the second rotary electric machine 40 and transmitting at least the power of the second rotary electric machine 40 to the wheel driving shaft 2 to drive the vehicle 100.

When the driving mode is the EV mode, the electronic control unit 200 makes the internal combustion engine 10 stop. In that state, the charged power of the battery 50 is used to drive the powered operation of the second rotary electric machine 40. The power of the second rotary electric machine 40 alone is used to turn the wheel drive shaft 2 and drive the vehicle 100. That is, when the driving mode is the EV mode, the electronic control unit 200 stops the internal combustion engine 10 and, in that state, controls the output of the second rotary electric machine 40 based on the driving load so as to obtain the demanded output corresponding to the driving load so as to drive the vehicle 100.

On the other hand, the CS mode is the mode of driving the vehicle 100 so that the state of charge of the battery is sustained at the state of charge of the battery when switching to the CS mode (below, the "sustained state of charge").

Figure 2:
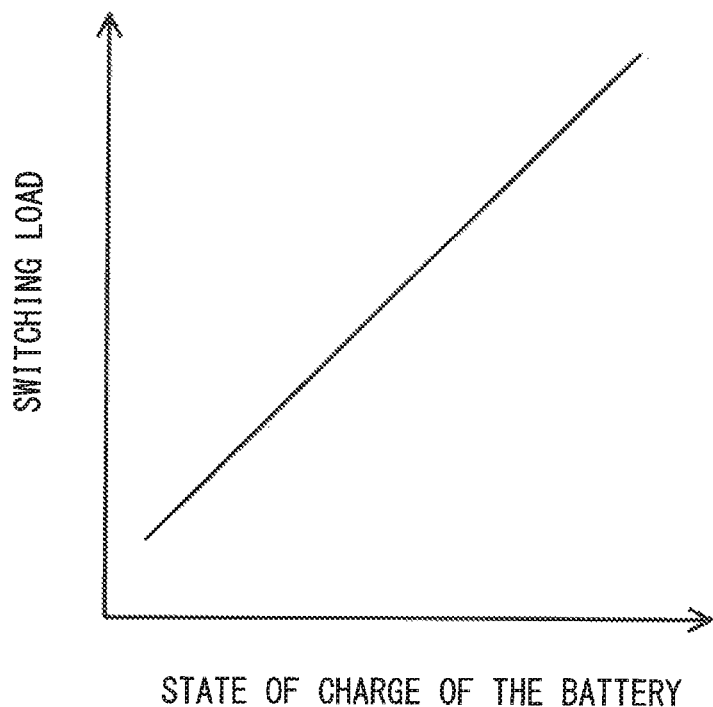
FIG. 2 is a table showing the relationship between a state of charge of a battery and switching load.

When the driving mode is the CS mode, the electronic control unit 200 switches the driving mode to either of the above-mentioned EV mode or (hybrid vehicle) mode to drive the vehicle 100. Specifically, when the driving mode is the CS mode, the electronic control unit 200 sets the driving mode to the EV mode if the driving load is less than the switching load and sets the driving mode to the HV mode if the driving load is the switching load or more. Further, the electronic control unit 200, as shown in FIG. 2, changes the switching load in accordance with the state of charge of the battery so that the switching load becomes smaller the smaller the state of charge of the battery.

The HV mode is a mode operating the internal combustion engine 10, preferentially utilizing the generated power of the first rotary electric machine 30 to drive the powered operation of the second rotary electric machine 40, and transmitting both power of the internal combustion engine 10 and second rotary electric machine 40 to the wheel driving shaft 2 to drive the vehicle 100. When the mode becomes the HV mode during the CS mode, the electronic control unit 200 divides the power of the internal combustion engine 10 by the power dividing mechanism 20 into two systems, transmits one of the divided parts of power of the internal combustion engine 10 to the wheel driving shaft 2, and uses the other power to drive the regenerative operation of the first rotary electric machine 30. Further, basically, it uses the generated electric power of the first rotary electric machine 30 to drive the powered operation of the second rotary electric machine 40 and transmits the power of the second rotary electric machine 40 in addition to one part of the power of the internal combustion engine 10 to the wheel drive shaft 2 to drive the vehicle 100.

Note that if the driving mode is the CS mode, when the state of charge of the battery becomes less than the sustained state of charge at the time the vehicle 100 is stopped, the electronic control unit 200 uses the power of the internal combustion engine 10 to drive the regenerative operation of the first rotary electric machine 30 and uses the generated electric power of the first rotary electric machine 30 to charge the battery so that the state of charge of the battery becomes the sustained state of charge or more.

In this way, when the driving mode is the CS mode, the electronic control unit 200 controls the outputs of the internal combustion engine 10 and second rotary electric machine based on the state of charge of the battery and driving load so as to obtain the demanded outputs corresponding to the driving load and thereby drive the vehicle 100.

In the case of a hybrid vehicle able to switch the driving mode between the EV mode and the CS mode in this way, to keep down the amount of fuel consumption, it is desirable to preferentially set the EV mode as the driving mode while there is a surplus in the state of charge of the battery.

On the other hand, the internal combustion engine 10 tends to become poorer in heat efficiency the lower the engine load. For this reason, for example, at the time of a driving section with a large number of traffic lights or a driving section with a large amount of traffic and tendency for congestion or another driving section where a vehicle frequently repeatedly starts and stops and continues to drive at a low speed, it is desirable to set the driving mode to the EV mode to drive the vehicle 100.

Further, at the time of a driving section enabling continuous steady driving while maintaining a certain constant speed or more or another driving section enabling driving in an engine load region with a good heat efficiency, it is desirable to set the driving mode to the CS mode and establish a state enabling driving in the HV mode to drive the vehicle 100.

Therefore, in the present embodiment, a driving plan specifying which driving sections on a projected route to a destination to drive on by the EV mode and which driving sections to drive on by the CS mode is prepared and the driving modes are switched in accordance with the driving plan to keep down the amount of fuel required for driving.

At this time, rather than preparing a driving plan optimizing driving in one trip up to the destination (from when start switch 214 of vehicle is turned ON to when it is turned OFF), sometimes preparing a driving plan optimizing driving in a driving route as a whole comprised of a plurality of trips such as the case of for example commuting between the home and workplace or the case of making the rounds of a plurality of destinations (relay points) then returning to the home or another initial starting point (in the former case, two trips of the outgoing trip and return trip, while in the latter case, for example, if there are two destinations, three trips) would enable the amount of fuel required for driving to be kept down.

For example, if considering the case of commuting between the home and workplace, in the case of a driving plan optimizing driving in the outgoing and return trips, sometimes a CS section (driving section in which the driving mode is set to the CS mode) is set on the driving routes of both the outgoing trip and return trip. In the CS section, if the driving load becomes the switching load or more, the HV mode is entered and the internal combustion engine 10 is started up. When starting up the internal combustion engine 10 at the start of each trip, it is necessary to promote heating of the catalyst so as to secure the exhaust performance, so fuel is additionally consumed for heating the catalyst. For this reason, in the case of a driving plan optimizing driving in the outgoing and return trips, sometimes extra fuel is consumed for heating the catalyst at least one time each in both of the outgoing and return trips.

As opposed to this, if possible to set up a driving plan optimizing driving of a driving route as a whole comprised of a plurality of trips and enabling driving entirely in the EV mode in either the outgoing or return driving route, the catalyst need only be heated once, so it is possible to keep down the consumption of fuel for heating the catalyst. As a result, if looking at the total amount of fuel consumption in the ease of commuting between the home and workplace, sometimes it is possible to keep down the consumption of fuel for heating the catalyst so as to keep down the total amount of fuel consumption more than a driving plan optimizing driving in the individual outgoing and return trips.

Therefore, in the present embodiment, it is made possible to prepare a driving plan enabling reduction of the number of times of heating the catalyst. Below, the preparation of the driving plan according to the present embodiment will be explained referring to FIG. 3A to FIG. 5G.

Figure 3A:
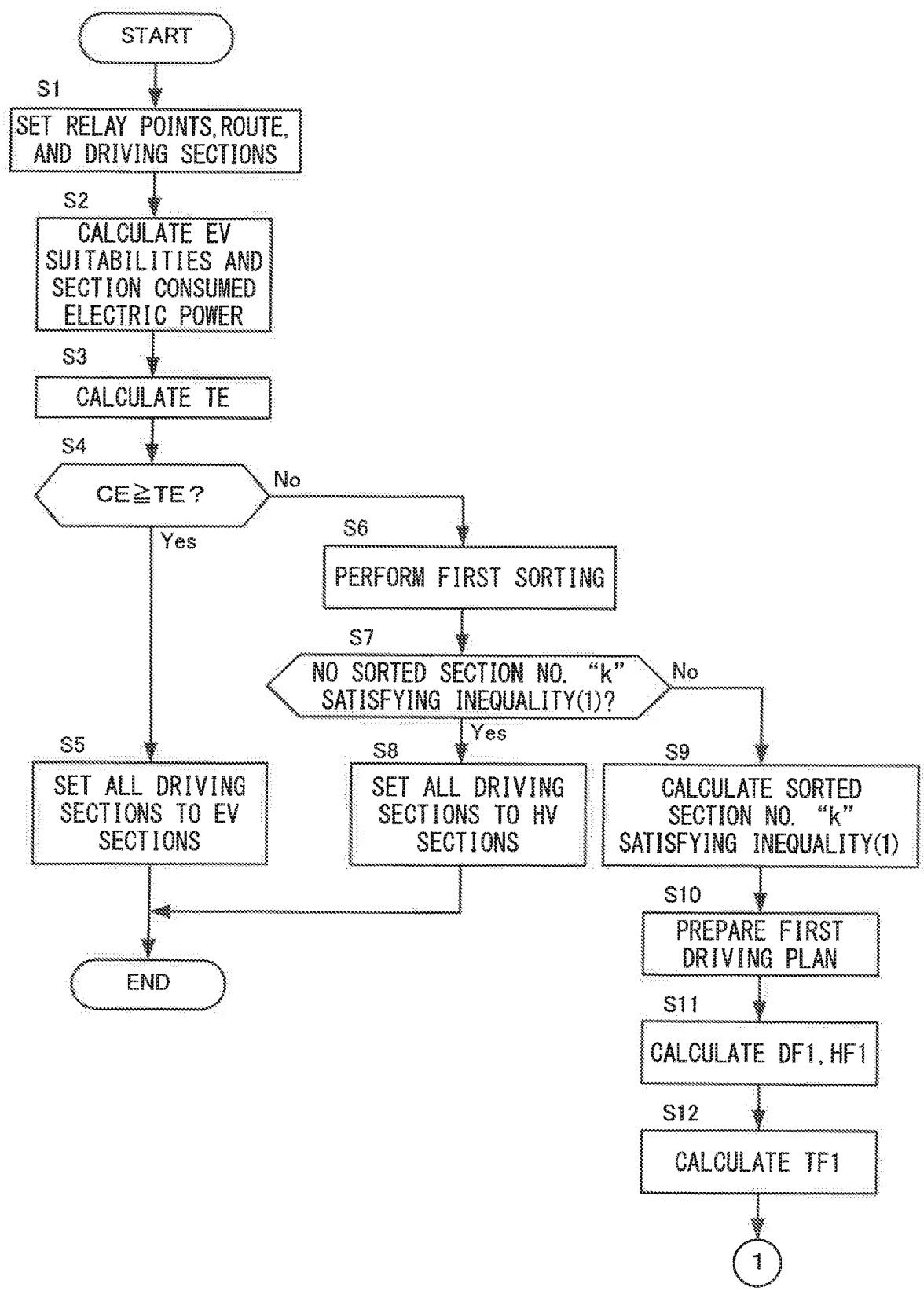
FIG. 3A is a flow chart explaining preparation of a driving plan according to the first embodiment of the present disclosure.
Figure 3B:
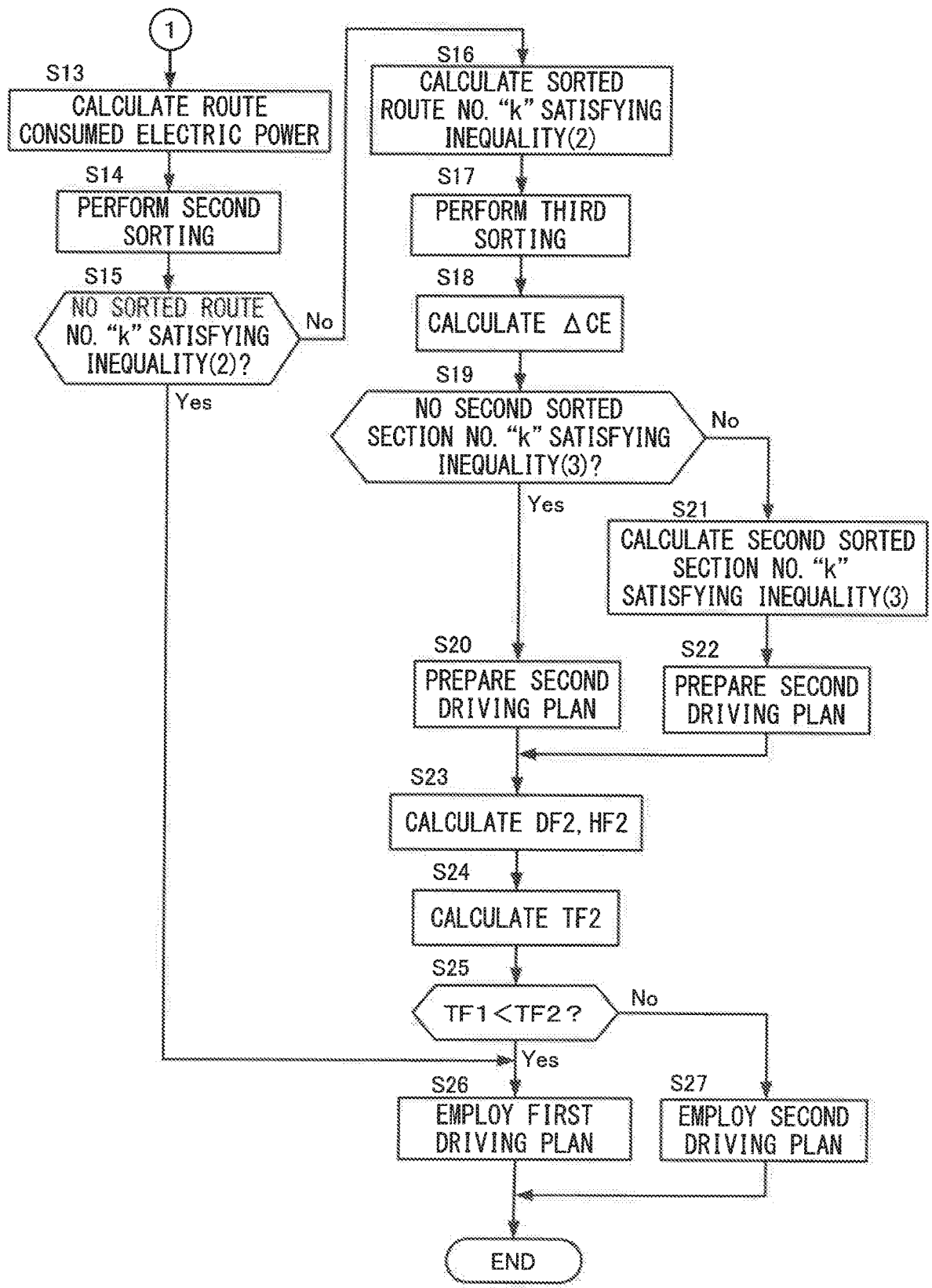
FIG. 3B is a flow chart explaining preparation of a driving plan according to the first embodiment of the present disclosure.

FIG. 3A and FIG. 3B are flow charts explaining preparation of a driving plan according to the present embodiment. Note that FIG. 4A to FIG. 4C are views explaining a first driving plan prepared without considering the amount of fuel consumption for heating the catalyst (section driving plan), while FIG. 5A to FIG. 5G are views explaining preparation of a second driving plan optimizing a plurality of trips considering the amount of fuel consumption for heating the catalyst (route priority driving plan).

Figure 4A:
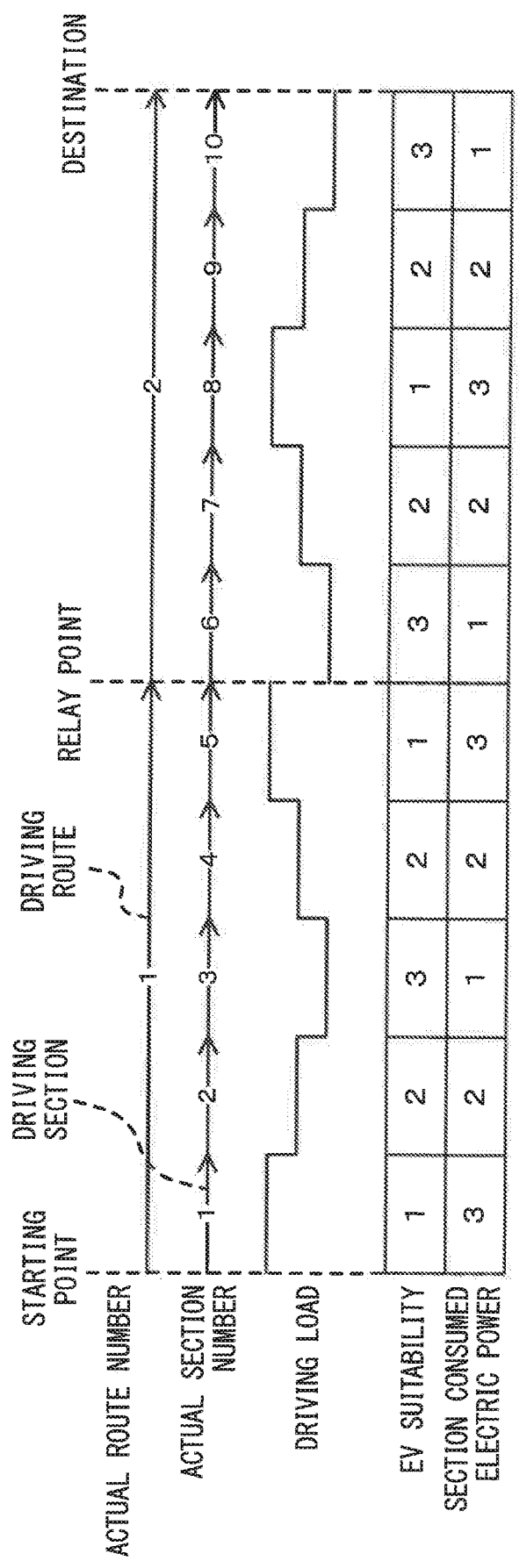
FIG. 4A is a view explaining a first driving plan according to the first embodiment of the present disclosure prepared without considering an amount of fuel consumption for heating a catalyst.
Figure 4B:
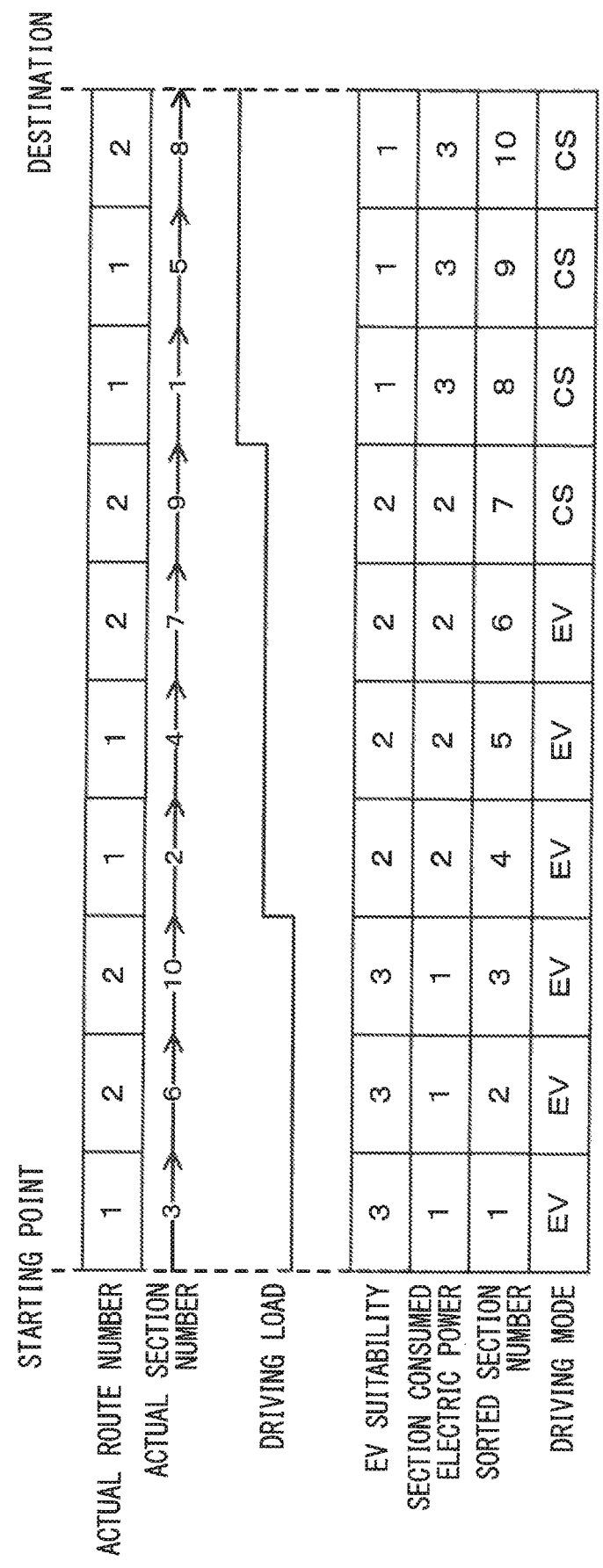
FIG. 4B is a view explaining a first driving plan according to the first embodiment of the present disclosure prepared without considering an amount of fuel consumption for heating a catalyst.
Figure 4C:
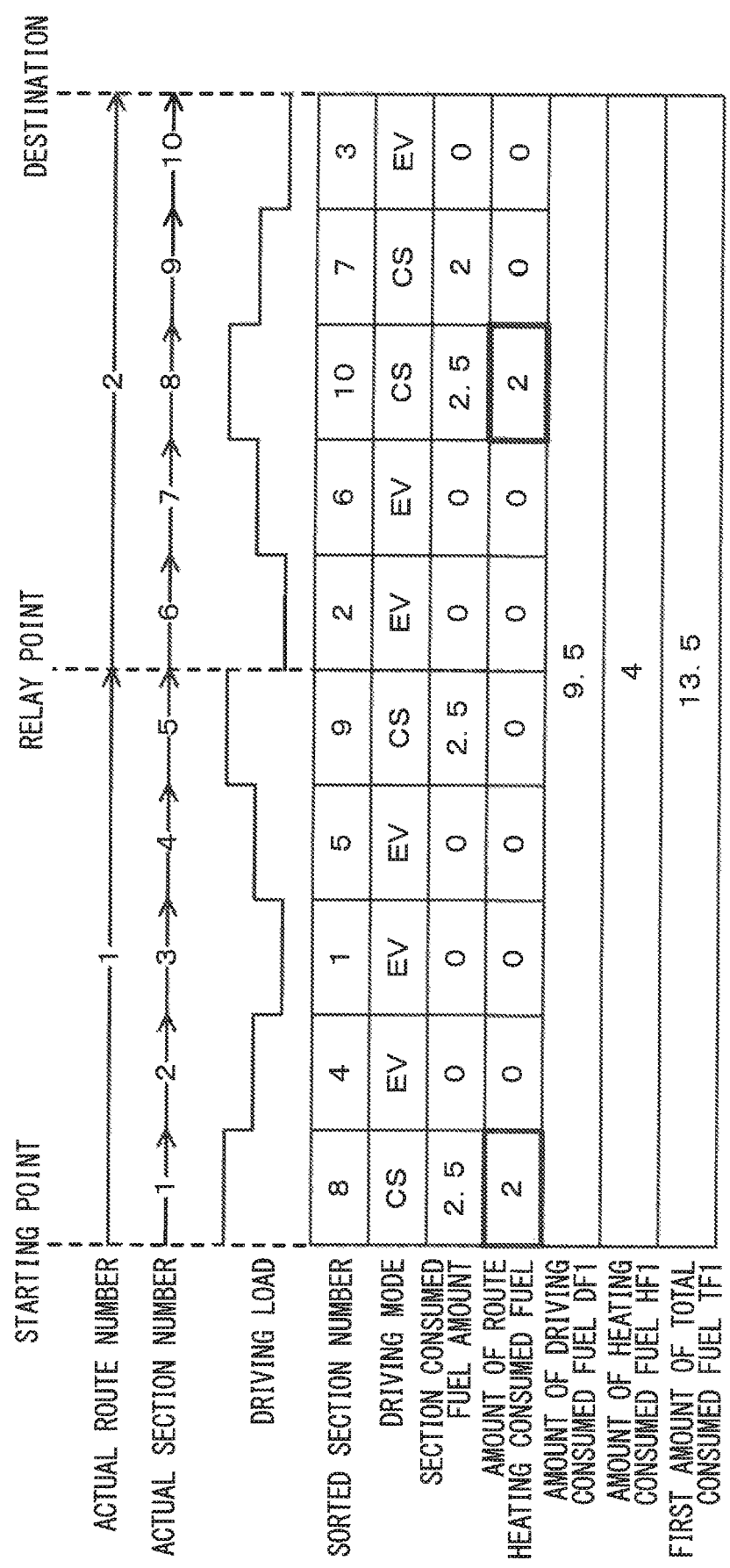
FIG. 4C is a view explaining a first driving plan according to the first embodiment of the present disclosure prepared without considering an amount of fuel consumption for heating a catalyst.

At step S1, the electronic control unit 200, as shown in FIG. 4A, sets one or more relay points on a projected route from a starting point to a destination to divide the projected route into a plurality of large driving routes and divide the individual driving routes into a plurality of further finer driving sections. Further, it sets actual section nos. "i" (i=1 . . . n; in the example shown in FIG. 4A, n=10) at the driving sections in order from the starting point and sets actual route nos. "i" (i=1, ..., n; in the example shown in FIG. 4A, n=2) at the driving routes.

Here, the starting point and destination are, for example, made a home parking lot, or other main location of storage of a vehicle 100. Note that, if the vehicle 100 for which a driving plan is prepared is a plug-in hybrid vehicle such as in the present embodiment, it is possible to make the starting point and destination locations enabling plug-in charging.

Further, a relay point is made an end point of one trip. For example, it is made a destination set at the starting point (destination of this). In addition as well, for example, in the case of a vehicle making the rounds of a plurality of destinations set in advance, it is possible to make each destination a relay point, while in the case of a vehicle used for commuting to work or commuting to school, it is also possible to make the work destination or school destination the relay point. By setting relaying points on a projected route in this way, it becomes possible to prepare a driving plan corresponding to the plurality of trips.

At step S2, the electronic control unit 200 calculates the driving load of the driving sections based on the road information of the driving sections (for example, the gradient, road type, speed limit, average curvature, etc.). Further, the electronic control unit 200, as shown in FIG. 4A, calculates the EV suitability of the driving sections and the estimated amount of consumed electric power at the driving sections when driving through the driving sections by the EV mode (below, referred to as the "section consumed electric power") based on the driving load of the driving sections. The EV suitability is an indicator expressing to what extent a driving section is a section suitable for EV driving. The lower the driving load of the driving sections, the higher the value (that is, the more suitable for EV driving).

In FIG. 4A, to facilitate understanding of the disclosure, the EV suitability is described simplified by dividing the EV suitability into 1 (low EV suitability) to 3 (high EV suitability) based on the driving load of the driving sections. Further, the section consumed electric power is also described simplified by dividing the section consumed electric power into 1 (small section consumed electric power) to 3 (large section consumed electric power) in accordance with its magnitude.

At step S3, the electronic control unit 200 calculates the estimated amount of electric power consumption TE when driving through the projected route by the EV mode (below, referred to as the "total consumed electric power") based on the section consumed electric power of the driving sections.

At step S4, the electronic control unit 200 calculates the amount of electric power CE of the battery 50 able to be used for EV driving (below, referred to as the "available electric power") based on the state of charge of the battery and judges if the available electric power CE is the total consumed electric power TE or more. The electronic control unit 200 proceeds to the processing of step S5 when the available electric power CE is the total consumed electric power TE or more. On the other hand, the electronic control unit 200 proceeds to the processing of step S6 when the available electric power CE is less than the total consumed electric power TE.

At step S5, the electronic control unit 200 sets all of the driving sections to EV sections since if the available electric power CE is the total consumed electric power TE or more, the projected route can be driven through by the EV mode.

At step S6, the electronic control unit 200, as shown in FIG. 4B, performs first sorting to rearrange the driving sections and sets the sorted section nos. "i" (i=1, ..., n; in the example shown in FIG. 4B, n=10) at the driving sections in the rearranged order. Specifically, the electronic control unit 200, as shown in FIG. 4B, ignores the driving routes and rearranges the driving sections in the order of the highest EV suitability down, rearranges the driving sections with the same EV suitability in the order of the lowest section consumed electric power up, and if the same in section consumed electric power as well, rearranges them in the order of the smallest actual section number up.

At step S7, the electronic control unit 200 judges if there is a sorted section no. "k" satisfying the following inequality (1). The DE of the inequality (1) shows the added value of the section consumed electric powers added in the order from the driving section with a high EV suitability and a small section consumed electric power. In the inequality (1), $DE_k$ is the total value (added value) of the section consumed electric powers of the driving sections from the sorted section no. 1 to the sorted section no. "k", while $DE_{k+1}$ is the total value (added value) of the section consumed electric powers of the driving sections from the sorted section no. 1 to the sorted section no. k+1:

$$DE_k \leq CE < DE_{k+1} \qquad (1)$$

The electronic control unit 200 judges that there is no sorted section no. "k" satisfying the inequality (1) if the section consumed electric power $DE_1$ of the driving section when the sorted section no. "k" is 1 is larger than the available electric power CE. In this case, the electronic control unit 200 judges that there is no driving section which can be driven through by the EV mode and proceeds to the processing of step S8. On the other hand, the electronic control unit 200 judges that there is a sorted section no. "k" satisfying the inequality (1) if the section consumed electric power $DE_1$ of the driving section when the sorted section no. "k" is 1 is the available electric power CE or less and proceeds to the processing of step S9.

At step S9, the electronic control unit 200 calculates the sorted section no. "k" satisfying the inequality (1). Note that below, the explanation will be given while comparing the case where the available electric power CE calculated at step S4 was 9 and the case where it was 10. In the example shown in FIG. 4B, $DE_6$ is 9 and $DE_7$ is 11, so both when the available electric power CE is 9 or 10, the sorted section no. "k" satisfying the inequality (1) becomes 6.

At step S10, the electronic control unit 200, as shown in FIG. 4B, sets the driving sections from the sorted section no. 1 to the sorted section no. "k" (in the example shown in FIG. 4B, k=6) to EV sections (driving sections in which the driving mode is set to the EV mode) and sets the driving sections from the sorted section no. k+1 to the sorted section no. "n" to CS sections. Further, the electronic control unit 200, as shown in FIG. 4C, rearranges the driving sections again in the order of the actual section numbers to prepare a first driving plan (section driving plan).

At step S11, the electronic control unit 200, as shown in FIG. 4C, calculates the estimated value of the amount of fuel consumed for driving in each CS section based on the road information of the driving section set as a CS section in the first driving plan (below, referred to as "amount of section consumed fuel") and calculates the total value of these as the amount of driving consumed fuel DF1 in the first driving plan.

Further, the electronic control unit 200 calculates the estimated value of the amount of fuel consumed for heating the catalyst at each driving route at which a CS section is set in the first driving plan (below, referred to as the "amount of route heating consumed fuel") and calculates the total value of these as the amount of heating consumed fuel HF1 in the first driving plan. In the present embodiment, as shown in FIG. 4C, it is assumed that fuel is consumed for heating the catalyst at a driving section first switched to the CS mode at each driving route, that is, a driving section first switched to the CS mode at each trip.

At step S12, the electronic control unit 200 calculates the estimated value TF1 of the amount of fuel consumed when driving through a predicted route while switching the driving model in accordance with the first driving plan (below, referred to as the "first amount of total consumed fuel"). Specifically, the electronic control unit 200, as shown in FIG. 4C, adds the amount of driving consumed fuel DF1 and the amount of heating consumed fuel HF1 at the first driving plan to calculate the first amount of total consumed fuel TF1.

Figure 5A:
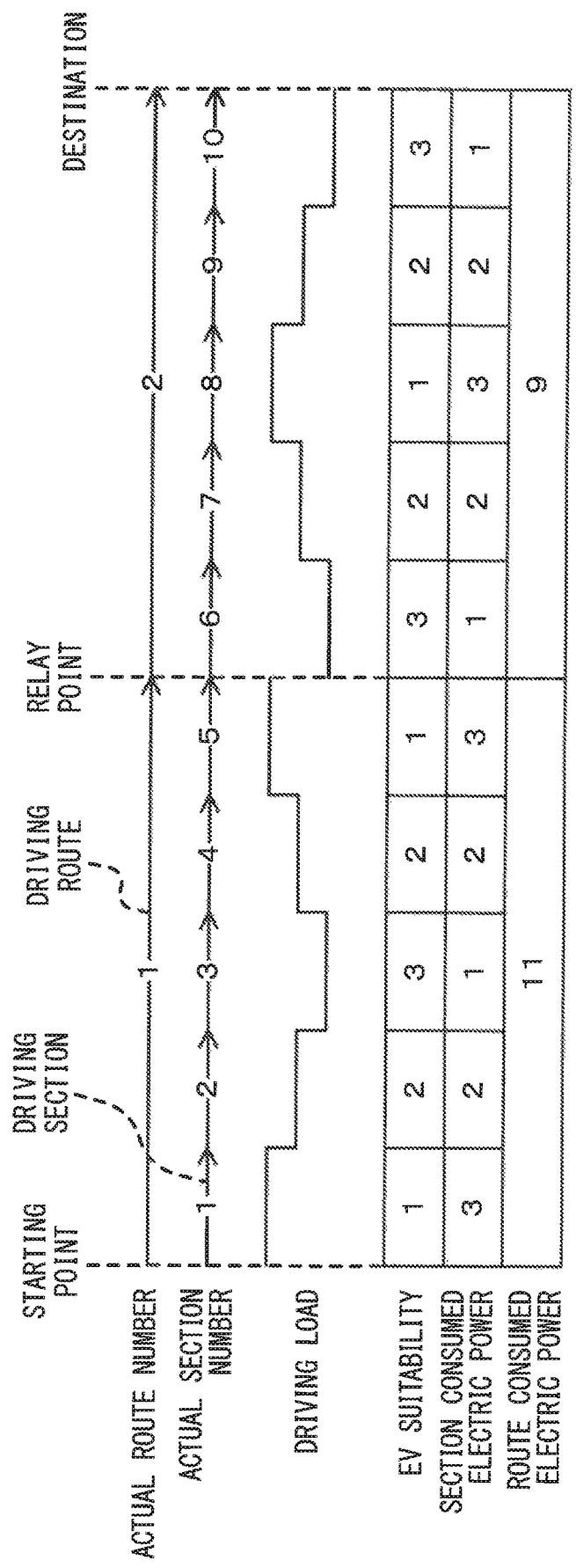
FIG. 5A is a view explaining preparation of a second driving plan according to the first embodiment of the present disclosure optimizing a plurality of trips while considering an amount of fuel consumption for heating a catalyst.

At step S13, the electronic control unit 200, as shown in FIG. 5A, calculates the estimated amount of consumed electric power at the driving routes when driving through the driving routes by the EV mode based on the section consumed electric power of the driving sections (below, referred to as the "route consumed electric power"). In FIG. 5A, the simplified total value for each driving route of the section consumed electric power of the driving sections is described as the route consumed electric power.

At step 14, the electronic control unit 200, as shown in FIG. 5B, performs second sorting to rearrange the driving routes and sets sorted route nos. "i" (i=1, . . . , n) for the driving routes in the rearranged order. Specifically, the electronic control unit 200, as shown in FIG. 5B, rearranges the driving routes in the order of the smallest route consumed electric power up.

At step S15, the electronic control unit 200 judges if there is a sorted route no. "k" satisfying the following inequality (2). RE of the inequality (2) shows the added value of the route consumed electric power added in the order of the driving route with the smallest route consumed electric power up. In the inequality (2), $RE_k$ is the total value (added value) of the route consumed electric power of the driving routes from the sorted route no. 1 to the sorted route no. "k", while $RE_{k+1}$ is the total value (added value) of the route consumed electric power of the driving routes from the sorted route no. 1 to the sorted route no. k+1.

$$RE_k \leq CE < RE_{k+1} \qquad (2)$$

The electronic control unit 200 judges that there is no sorted route no. "k" satisfying the inequality (2) if the route consumed electric power $RE_1$ of the driving route when the sorted route no. "k" is 1 is larger than the available electric power CE. In this case, the electronic control unit 200 judges that there is no driving route able to be driven through in the EV mode as is and proceeds to the processing of step S21. On the other hand, the electronic control unit 200 judges that there is a sorted route no. "k" satisfying the inequality (2) if the route consumed electric power $RE_1$ of the driving route when the sorted route no. "k" is 1 is the available electric power CE or less and proceeds to the processing of step S16.

At step S16, the electronic control unit 200 calculates the sorted route nos. "k" satisfying the inequality (2). In the example shown in FIG. 5B, $RE_1$ is 9 and $RE_2$ is 20, so if the available electric power CE is either of 9 or 10, the sorted route no. "k" satisfying the inequality (2) becomes 1.

Figure 5C:
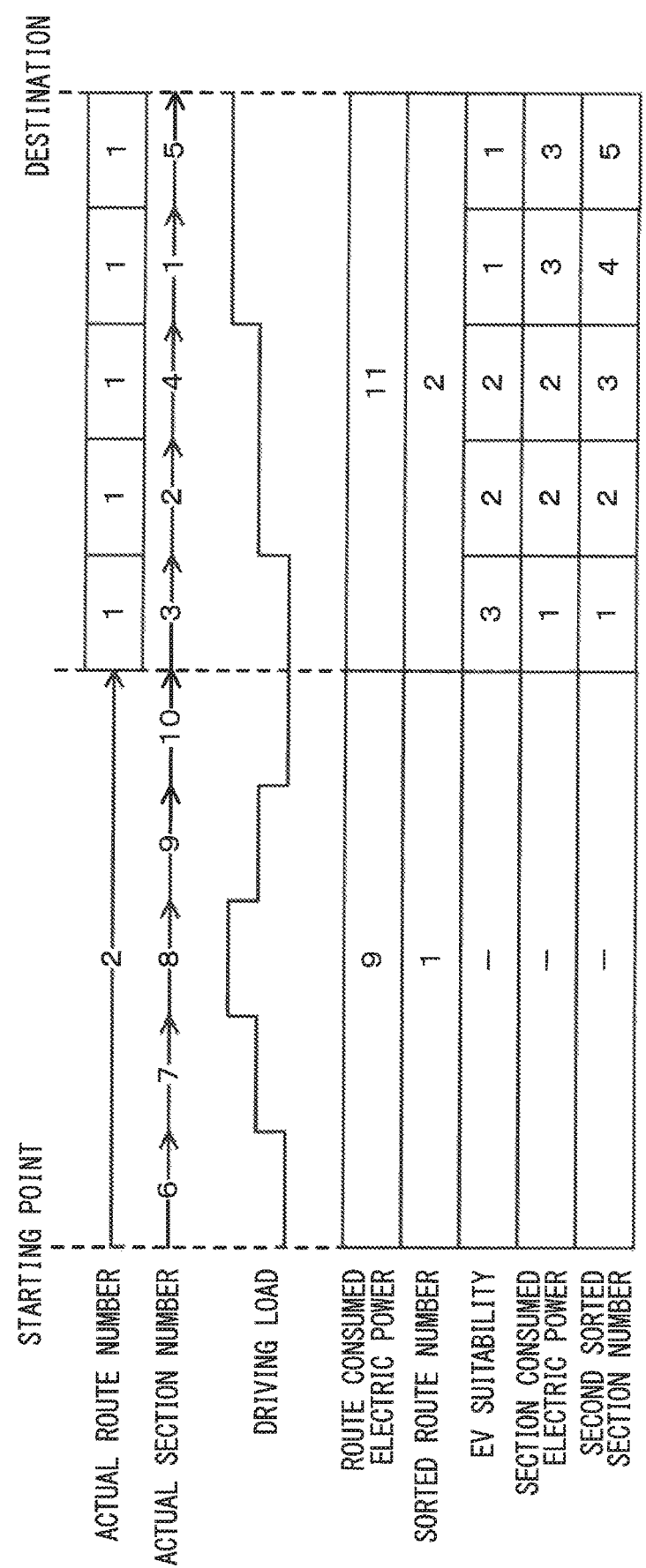
FIG. 5C is a view explaining preparation of a second driving plan according to the first embodiment of the present disclosure optimizing a plurality of trips while considering an amount of fuel consumption for heating a catalyst.

At step S17, the electronic control unit 200, as shown in FIG. 5C, performs third sorting of the driving sections on the driving routes from the sorted route no. k+1 to the sorted route no. "n" (in the example shown in FIG. 5C, k=1 and n=2) to rearrange the driving sections and sets second sorted section nos. "i" (i=1, . . . , n; in the example shown in FIG. 5C, n=5) to the driving sections in the rearranged order. Specifically, the electronic control unit 200, as shown in FIG. 5C, rearranges the driving sections on the driving routes from the sorted route no, k+1 to the sorted route no. "n" in the order of the highest EV suitability down, rearranges the driving sections with the same EV suitability in the order of the smallest section consumed electric power up, and rearranges the ones with the same section consumed electric power in the order of the smallest actual section number up.

At step S18, the electronic control unit 200 calculates the surplus electric power ΔCE of the battery 50 obtained by subtracting from the available electric power CE of the battery 50 the total value $RE_k$ of the route consumed electric power of the driving routes up to the sorted route no. "k". Here, even if the available electric power CE calculated at step S4 were 9, since $RE_1$ is 9, the surplus electric power ΔCE becomes 0. Further, even if the available electric power CE calculated at step S4 were 10, since $RE_1$ is 9, the surplus electric power ΔCE becomes 1.

At step S19, the electronic control unit 200 judges if there is a second sorted section no. "k" satisfying the following inequality (3). EE of the inequality (3) shows the added value obtained by adding the section consumed electric power in order from the driving section with a high EV suitability and small section consumed electric power in the driving routes from the sorted route no. k+1 to the sorted route no. "n". In the inequality (3), $EE_k$ is the total value (added value) of the section consumed electric power of the driving sections from the second sorted section no. 1 to the second sorted section no. "k", while $EE_{k+1}$ is the total value of the section consumed electric power of the driving sections from the second sorted section no. 1 to the sorted section no. k+1:

$$EE_k \leq \Delta CE < EE_{k+1} \qquad (3)$$

If section consumed electric power $EE_1$ of the driving section when the second sorted section no. "k" is 1 is larger than the surplus electric power ΔCE, the electronic control unit 200 judges that there is no second sorted section no. "k" satisfying the inequality (3). In this case, the electronic control unit 200 judges that there is no driving section able to be driven through by the EV mode in the driving sections on the driving routes from the sorted route no. k+1 to the sorted route no. "n" and proceeds to the processing of step S20. On the other hand, if the section consumed electric power $EE_1$ of the driving section of the second sorted section no. "k" of 1 is the surplus electric power ΔCE or less, the electronic control unit 200 judges that there is a second sorted section no. "k" satisfying the inequality (3) and proceeds to the processing of step S21.

In the example shown in FIG. 5C, the section consumed electric power $EE_1$ of the driving section of the second sorted section no. "k" of 1 is 1. For this reason, even if the available electric power CE calculated at step S4 is 9, as explained above, the surplus electric power ΔCE becomes 0, so it is judged that there is no second sorted section no. "k" satisfying the inequality (3) and the routine proceeds to the processing of step S20. On the other hand, even if the available electric power CE calculated at step S4 is 10, as explained above, the surplus electric power ΔCE becomes 1, so it is judged that there is a second sorted section no. "k" satisfying the inequality (3) and the routine proceeds to the processing of step S21.

Figure 5D:
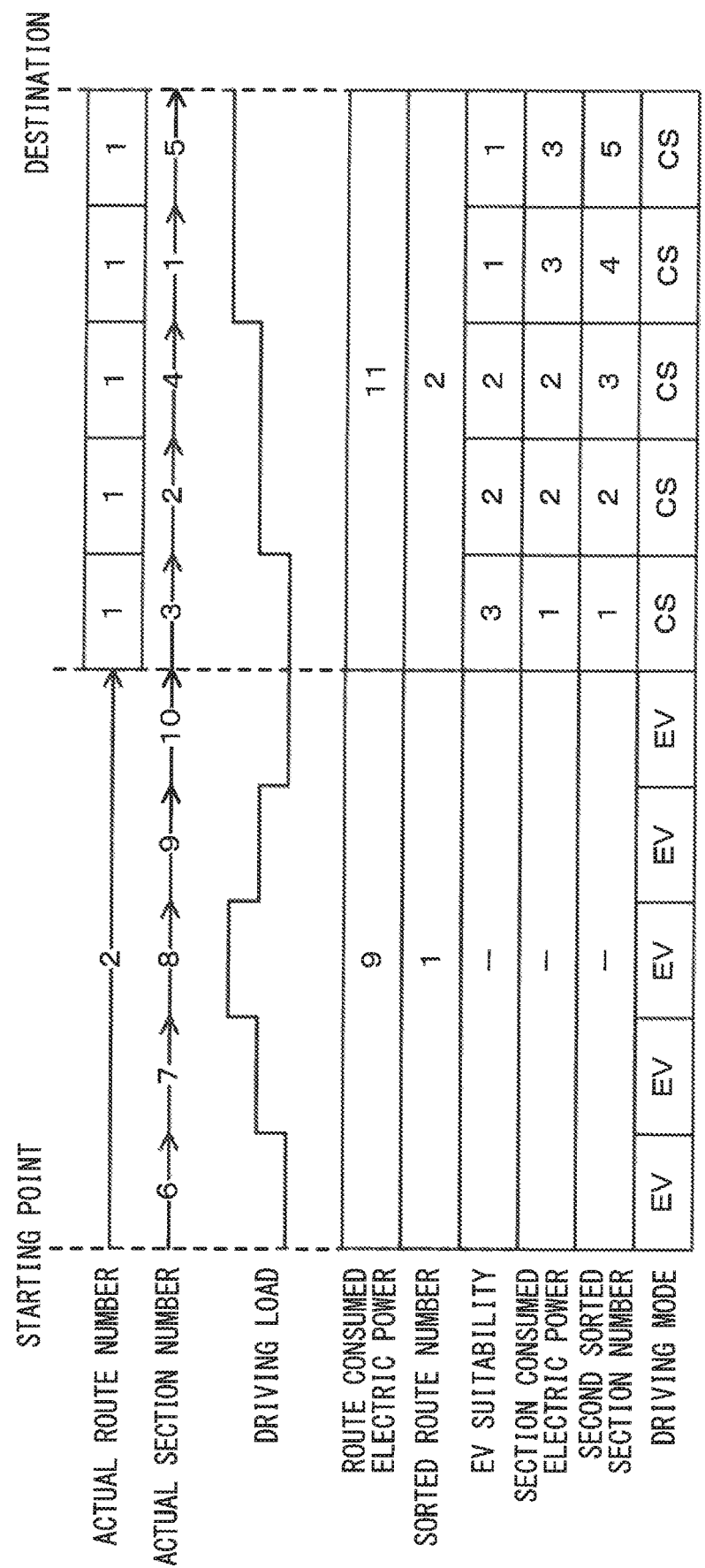
FIG. 5D is a view explaining preparation of a second driving plan according to the first embodiment of the present disclosure optimizing a plurality of trips while considering an amount of fuel consumption for heating a catalyst.

At step S20, the electronic control unit 200, as shown in FIG. 5D, sets the driving routes up to the sorted route no. "k"

(in the example shown in FIG. 5D, k=1) to EV routes in which all of the driving sections on the driving route are made EV sections and sets the driving routes from the sorted section no. k+1 to the sorted section no. "n" to CS sections in which all of the driving sections on the driving route are made CS sections. Further, the electronic control unit 200, as shown in FIG. 5E, again rearranges the driving routes in the order of the actual route numbers and sets these as the second driving plan (route priority driving plan).

At step S21, the electronic control unit 200 calculates the second sorted section no. "k" satisfying the inequality (3). In the example shown in FIG. 5C, $EE_k$ (=$EE_1$) becomes 1, while $EE_{k+1}$ (=$EE_2$) becomes 3, so if the available electric power CE calculated at step S4 is 10 and the surplus electric power ΔCE is 1, the second sorted section no. "k" satisfying the inequality (3) becomes 1.

Figure 5F:
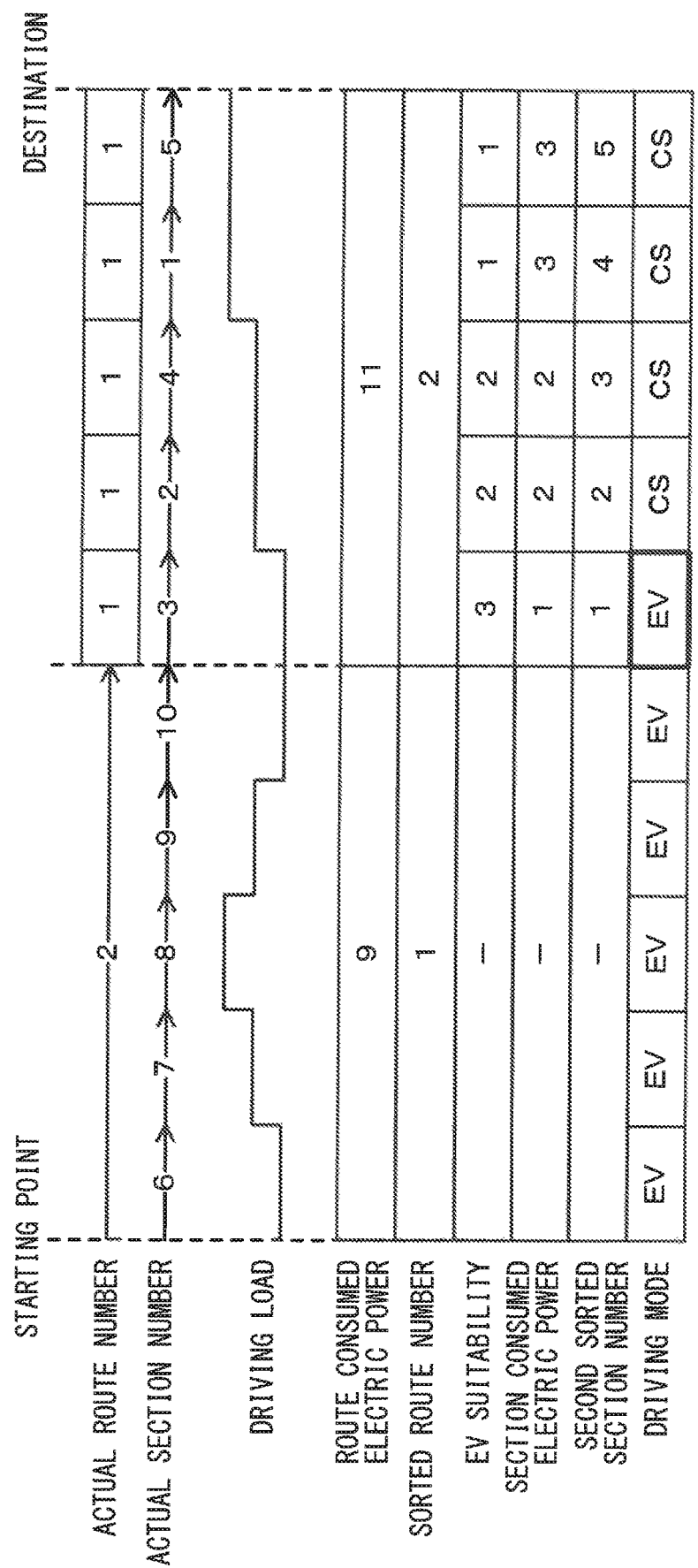
FIG. 5F is a view explaining preparation of a second driving plan according to the first embodiment of the present disclosure optimizing a plurality of trips while considering an amount of fuel consumption for heating a catalyst.

At step S22, the electronic control unit 200, as shown in FIG. 5F, sets the driving routes up to the sorted route "k" (in the example shown in FIG. 5F, k=1) to EV routes in which all of the driving sections on the driving route are made EV sections. Further, for the driving sections on the driving routes from the sorted route no. k+1 to the sorted route no. "n", the electronic control unit 200 sets the driving sections up to the second sorted section no. "k" (in the example shown in FIG. 5F, k=1) to EV sections and sets the driving sections from the second sorted section no. k+1 to the second sorted section no. "n" (in the example shown in FIG. 5F, n=5) to CS sections. Further, the electronic control unit 200, as shown in FIG. 5G, again rearranges the driving sections in the order of the actual section numbers and sets these as the second driving plan (route priority driving plan).

Figure 5G:
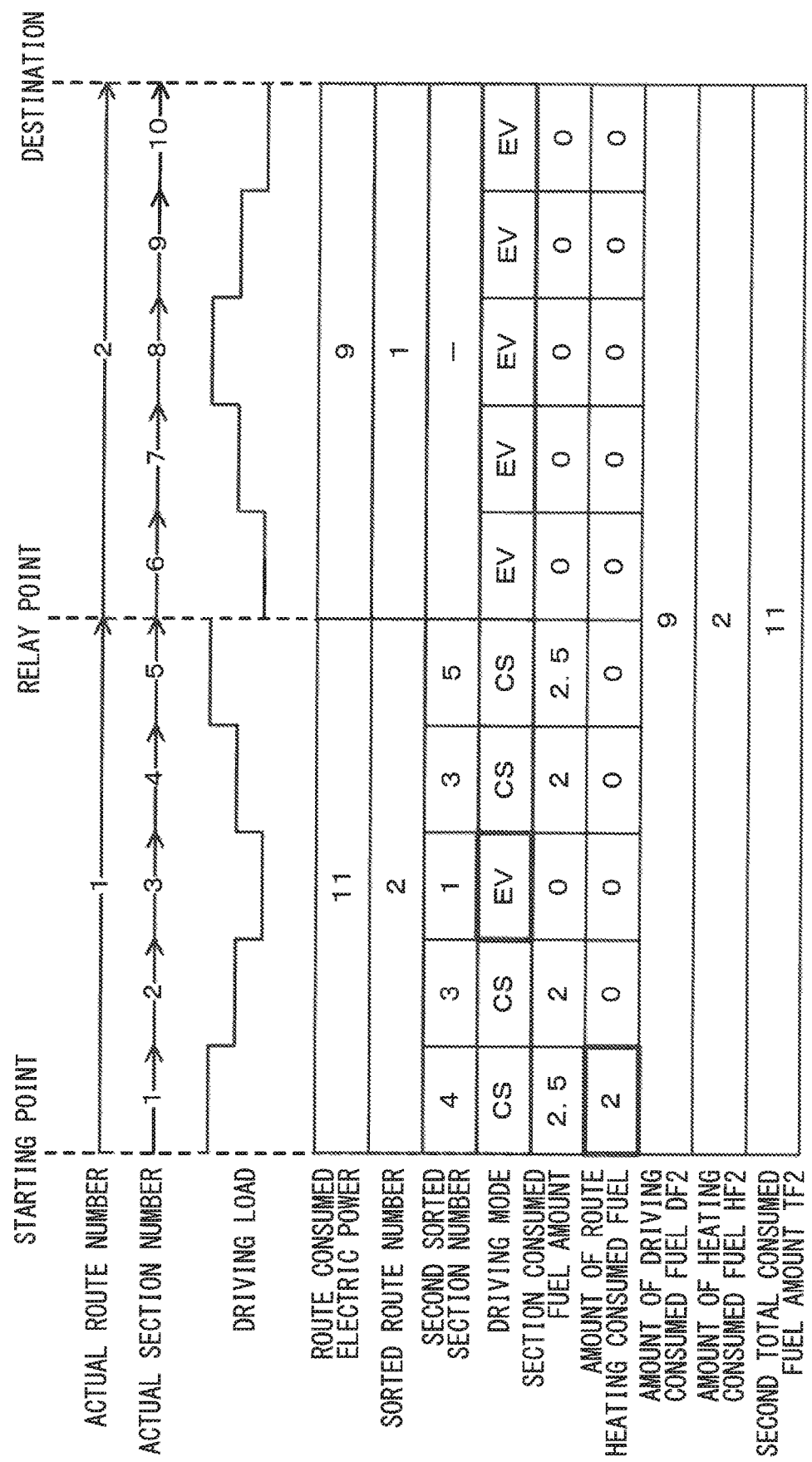
FIG. 5G is a view explaining preparation of a second driving plan according to the first embodiment of the present disclosure optimizing a plurality of trips while considering an amount of fuel consumption for heating a catalyst.

At step S23, the electronic control unit 200, as shown in FIG. 5E and FIG. 5G calculates the amounts of section consumed fuel of the CS sections and calculates the total value of these as the amount of driving consumed fuel DF2 in the second driving plan based on the road information of a driving section set as the CS section in the second driving plan.

Further, the electronic control unit 200 calculates the amounts of route heating consumed fuel of the driving route in which CS sections are set by the second driving plan and calculates the total value of these as the amount of heating consumed fuel HF2 in the second driving plan. As shown in FIG. 5E and FIG. 5G, in the second driving plan according to the present embodiment, an amount of route heating consumed fuel is generated at only the driving route of the actual route no. 1.

At step S24, the electronic control unit 200 calculates the estimated value TF2 of the amount of fuel consumed when driving through a predicted route while changing the driving mode in accordance with a second driving plan (below, referred to as the "second amount of total consumed fuel"). Specifically, the electronic control unit 200, as shown in FIG. 5E and FIG. 5G, adds the amount of driving consumed fuel DF2 and amount of heating consumed fuel HF2 at the second driving plan to calculate the second amount of total consumed fuel TF2.

At step S25, the electronic control unit 200 compares the magnitudes of the first amount of total fuel consumption TF1 and the second amount of total fuel consumption TF2, proceeds to the processing of step S21 when the first amount of total fuel consumption TF1 is small, and proceeds to the processing of step S22 when the second amount of total fuel consumption TF2 is small. Note that when the first amount of total fuel consumption TF1 and the second amount of total fuel consumption TF2 are the same, the routine may proceed to the processing of either step S21 and step S22, but in the present embodiment it proceeds to the processing of step S22.

At step S26, the electronic control unit 200 employs the first driving plan and performs control for switching the driving mode in accordance with the first driving plan.

At step S27, the electronic control unit 200 employs the second driving plan and performs control for switching the driving mode in accordance with the second driving plan.

Here, even if the available electric power CE calculated at step S4 is 9, the first driving plan shown in FIG. 4C and the second driving plan shown in FIG. 5E are prepared, but as shown in FIG. 4C and FIG. 5E, the amount of driving consumed fuel DF1 in the first driving plan prepared without considering the amount of fuel consumption for heating the catalyst becomes smaller than the amount of driving consumed fuel DF2 in the second driving plan optimizing the driving in a plurality of trips considering the amount of fuel consumption for heating the catalyst. However, if considering the heating consumed fuels HF1, HF2 in the driving plans, in the first driving plan, the catalyst has to be heated two times, so it is learned that the first amount of total fuel consumption TF1 becomes greater than the second amount of total fuel consumption TF2.

Further, even if the available electric power CE calculated at step S4 is 10, the first driving plan shown in FIG. 4C and the second driving plan shown in FIG. 5G are prepared, but in this case, it is learned that the amount of driving consumed fuel and the amount of total consumed fuel become smaller at the second driving plan.

In this regard, if preparing a driving plan dividing the driving route into a plurality of driving sections and setting which of the driving modes of the EV mode or CS mode to drive by in the driving sections, as shown in FIG. 4C and FIG. 5G, sometimes some of the driving routes (in FIG. 4C, the driving route of the actual route nos. 1 and 2, while in FIG. 5G, the driving route of the actual route no. 1) become driving routes where EV sections and CS sections are mixed. If in this way a driving route occurs in which EV sections and CS sections are mixed, the following such problem is liable to occur. Below, referring to FIG. 6, this problem point will be explained.

Figure 6:
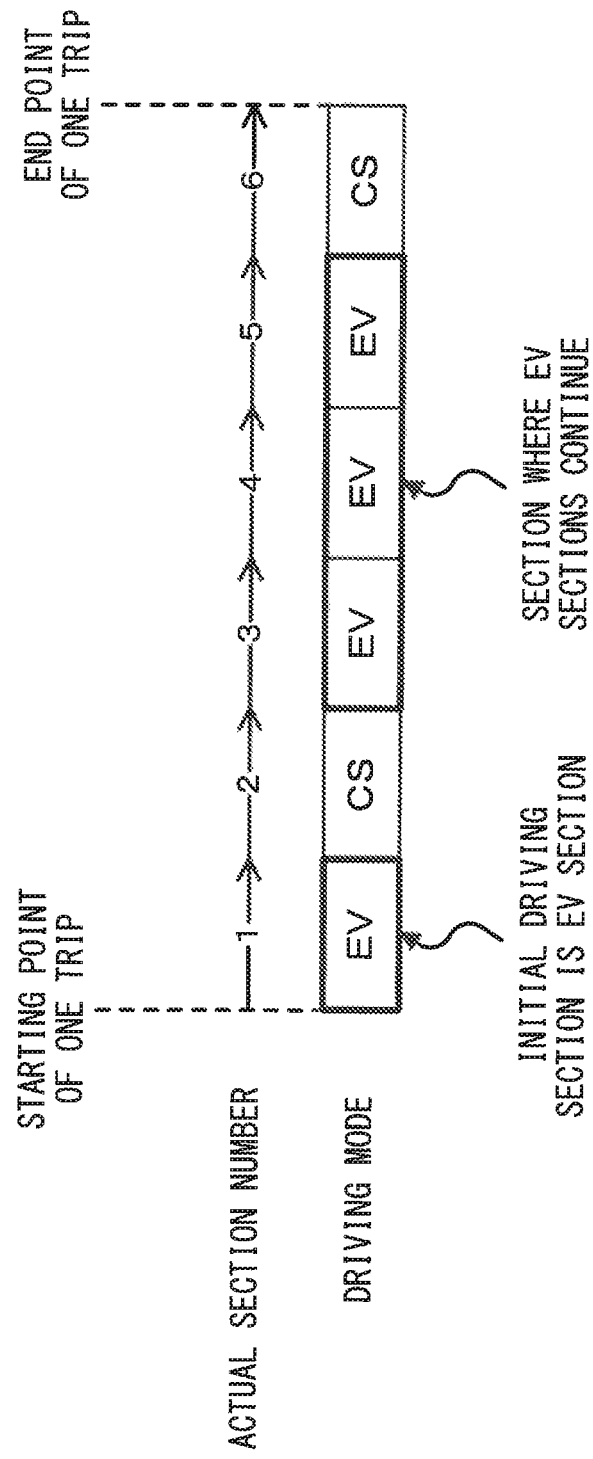
FIG. 6 is a view explaining a problem arising in a driving route in which EV sections and CS sections are mixed.

FIG. 6 is a view explaining the problem points occurring on a driving route where EV sections and CS sections are mixed.

As shown in FIG. 6, as a result of the driving plan being prepared, at a certain driving route, sometimes the initial driving section is set to the EV section. Further, sometimes after a driving section set as a CS section (in FIG. 6, driving section of actual section no. 2), driving sections set as EV sections (in FIG. 6, driving sections of actual section nos. 3 to 5) successively continue, then again a driving section set as a CS section (in FIG. 6, driving section of actual section no. 6) occurs.

If in this way the initial driving section of a certain driving route is an EV section, if ending up heating the catalyst at the start of the driving route, the catalyst temperature will end up falling during the initial EV section, so it is preferable to perform the initial heating of the catalyst at the initial CS section of the driving route.

Further, in a certain driving route, if driving sections set as EV sections successively continue after a CS section, the time and distance of driving in the EV mode become longer, so the temperature of the catalyst finished being heated in the CS section before the EV sections is liable to end up failing to below the activation temperature where the exhaust purification function of the catalyst activates in the EV sections.

This being so, if a CS section is set after the EV sections, the catalyst has to be heated up again at the CS section after the EV sections, so until the catalyst finishes being heated, the exhaust performance will deteriorate and the amount of fuel consumed when driving while switching the driving mode according to the driving plan will end up increasing from what is anticipated. On the other hand, if a CS section is not set after the EV sections, since the internal combustion engine 10 will not be started up after the EV sections, even if the catalyst temperature falls to below the activation temperature during the EV sections, such a problem will not arise.

Therefore, in the present embodiment, if the initial driving section of a certain driving route is an EV section, catalyst initial heating control is performed so as to enable initial heating of the catalyst at the initial CS section in that driving route. Further, in a driving route where EV sections and CS sections are mixed, it is possible to perform catalyst temperature raising control temporarily operating the internal combustion engine 10 in accordance with need to raise the catalyst temperature so that the temperature of the catalyst heated once does not fill to less than the activation temperature.

Figure 7:
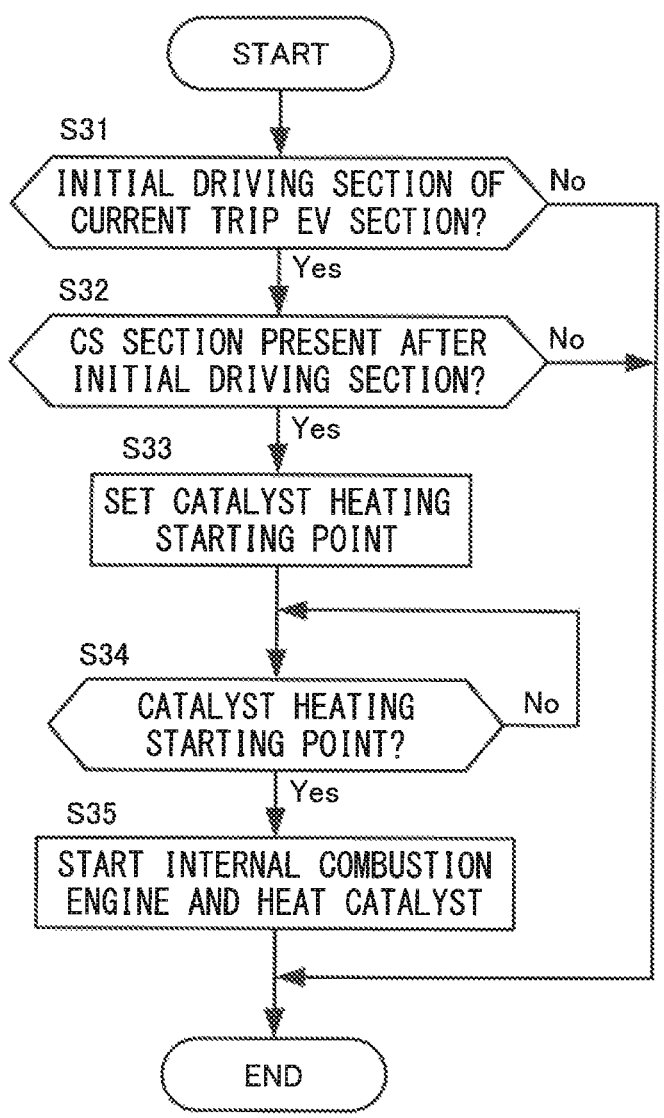
FIG. 7 is a flow chart explaining catalyst initial heating control according to the first embodiment of the present disclosure.

FIG. 7 is a flow chart explaining catalyst initial heating control according to the present embodiment.

At step S31, the electronic control unit 200 judges if the initial driving section of the current trip is an EV section. The electronic control unit 200 proceeds to the processing of step S32 if the initial driving section of the current trip is an EV section. On the other hand, the electronic control unit 200 ends the current processing if the initial driving section of the current trip is the CS section since the catalyst will be initially heated at the start of the current trip.

At step S32, the electronic control unit 200 judges if there is a CS section present in the driving sections after the initial driving section. The electronic control unit 200 proceeds to the processing of step S33 if there is a CS section present in the driving sections after the initial driving section. On the other hand, the electronic control unit 200 ends the current processing if there is a no CS section present in the driving sections after the initial driving section.

At step S33, the electronic control unit 200 sets the initial heating starting point of the catalyst. In the present embodiment, the electronic control unit 200 sets a point before the starting point of the driving section first set as a CS section during the driving route of the current trip as the initial heating starting point of the catalyst. Note that the initial heating starting point of the catalyst may also be the starting point of the CS section.

At step S34, the electronic control unit 200 judges if the current position of the vehicle 100 is the initial heating starting point of the catalyst. The electronic control unit 200 proceeds to the processing of step S35 if the current position of the vehicle 100 is the initial heating starting point of the catalyst. On the other hand, the electronic control unit 200 stands by until the current position of the vehicle 100 becomes the initial heating starting point of the catalyst if the current position of the vehicle 100 is not the initial heating starting point of the catalyst.

At step S35, the electronic control unit 200 performs the initial heating of the catalyst during a predetermined time or until the starting point of the CS section. In the present embodiment, the electronic control unit 200 starts the internal combustion engine 10 and, for example, delays the ignition timing and otherwise controls the exhaust temperature to a higher temperature than usual to operate the internal combustion engine 10.

Figure 8:
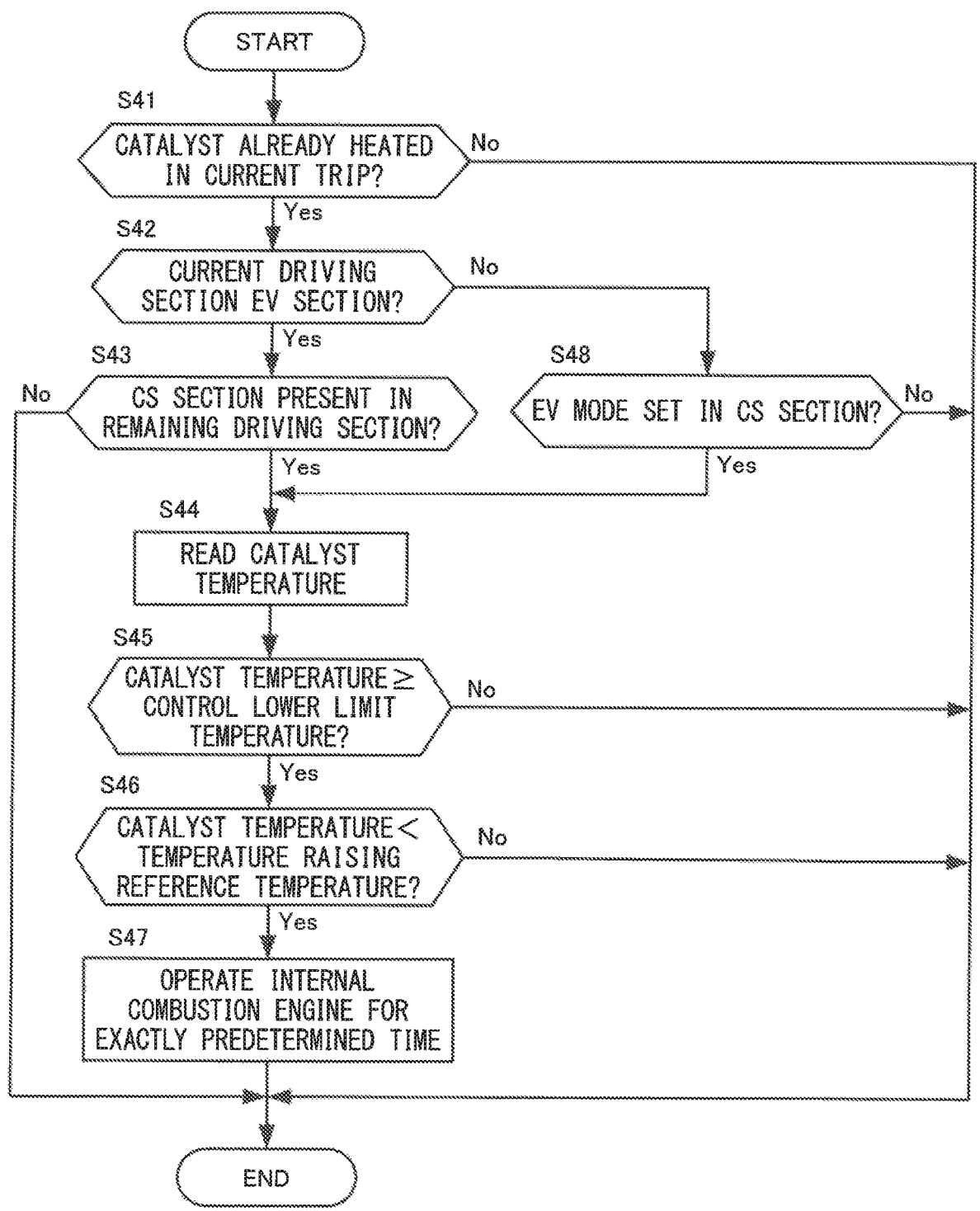
FIG. 8 is a flow chart explaining catalyst temperature raising control according to the first embodiment of the present disclosure.

FIG. 8 is a flow chart explaining catalyst temperature raising control according to the present embodiment.

At step S41, the electronic control unit 200 judges if the catalyst has already been heated once in the current trip. In the present embodiment, the electronic control unit 200 judges that the catalyst has already been heated once if already driving on a CS section in the current trip and then proceeds to the processing of step S42. On the other hand, the electronic control unit 200 judges that the catalyst has still not been heated even once in the current trip if not driving on a CS section even one time in the current trip and then ends the processing.

At step S42, the electronic control unit 200 judges if the current driving section is an EV section. The electronic control unit 200 proceeds to the processing of step S43 if the current driving section is an EV section. On the other hand, the electronic control unit 200 proceeds to the processing of step S48 if the current driving section is not an EV section.

At step S43, the electronic control unit 200 judges if there is a CS section in the remaining driving sections of the current trip. The electronic control unit 200 proceeds to the processing of step S44 if there is a CS section in the remaining driving sections of the current trip. On the other hand, the electronic control unit 200 ends the current processing if there is no CS section in the remaining driving sections of the current trip.

At step S44, the electronic control unit 200 reads the catalyst temperature detected by the catalyst temperature sensor 210. Note that if not providing the catalyst temperature sensor 210, for example, it is also possible to estimate the catalyst temperature based on the catalyst temperature at the time of stopping the internal combustion engine 10 or the time elapsed from when stopping the internal combustion engine 10 etc.

At step S45, the electronic control unit 200 judges if the catalyst temperature is a predetermined control lower limit temperature or more. The control lower limit temperature is a temperature corresponding to the catalyst temperature at the time of cold start of the internal. combustion engine 10 and for example can be made the average outside air temperature. The control lower limit temperature is a temperature lower than the activation temperature.

Even if having already driven once in the HV mode in the current trip, if the driving period is short etc., the catalyst temperature does not rise much at all. The catalyst temperature may conceivably not change much at all from the temperature at the time of cold start of the internal combustion engine 10. In such a case, it is necessary to heat the catalyst at an UV section after an EV section, so there is in the end no need to temporarily operate the internal combustion engine 10 in the EV section to raise the catalyst temperature. For this reason, the electronic control unit 200 proceeds to the processing of step S46 if the catalyst temperature is a predetermined control lower limit temperature or more and ends the current processing if the catalyst temperature is less than the control lower limit temperature.

At step S46, the electronic control unit 200 judges if the catalyst temperature is less than a predetermined temperature raising reference temperature. The electronic control unit 200 proceeds to the processing of step S47 if the catalyst temperature is less than the temperature raising reference temperature. On the other hand, the electronic control unit 200 ends the current processing if the catalyst temperature is the temperature raising reference temperature or more.

At step S47, the electronic control unit 200 starts up the internal combustion engine 10 and operates the internal combustion engine 10 for exactly a predetermined time to make the catalyst temperature rise.

Note that if proceeding to the processing of step S47, it is also possible to start up the internal combustion engine 10 only when the driving load is a driving load able to operate the internal combustion engine 10 by a predetermined heat efficiency or more or a greater load. This is because, for example, if operating the internal combustion engine 10 when the vehicle is stopped or is driving at a low speed or otherwise when the engine load is low, the internal combustion engine 10 would be operated in a state with a low heat efficiency, so the amount of fuel consumption would be liable to increase.

At step S48, the electronic control unit 200 judges if the driving mode has been set to the EV mode in a CS section. The electronic control unit 200 proceeds to the processing of step S44 so as to keep the catalyst temperature from ending up becoming less than the activation temperature when switching to the HV mode in a CS section since, in the same way as in the EV section, the catalyst temperature ends up falling if the driving mode is set to the EV mode in a CS section. On the other hand, the electronic control unit 200 judges that the internal combustion engine 10 is being operated and the catalyst temperature is not liable to fall if the driving mode is set to the HV mode in a CS section and ends the current processing.

According to the present embodiment explained above, there is provided an electronic control unit 200 (control device) for controlling a hybrid vehicle provided with an internal combustion engine 10, a rechargeable battery 50, and a second rotary electric machine 40 (rotary electric machine) driven by electric power of the battery 50. The electronic control unit 200 is provided with a driving plan preparing part preparing a driving plan dividing the driving route into a plurality of driving sections and setting which driving mode to drive over the driving sections by among an EV mode controlling the output of the second rotary electric machine 40 based on the driving load to drive the hybrid vehicle and a CS mode controlling the outputs of the internal combustion engine 10 and the second rotary electric machine 40 based on the state of charge of the battery and driving load to drive the hybrid vehicle, a driving mode switching part switching the driving mode in accordance with the driving plan, and a catalyst temperature raising control part performing catalyst temperature raising control raising the temperature of the exhaust purification catalyst of the internal combustion engine 10.

Further, the catalyst temperature raising control part is configured so as to perform catalyst temperature raising control when the temperature of the exhaust purification catalyst is less than a predetermined temperature raising reference temperature higher than an activation temperature where the exhaust purification function of the exhaust purification catalyst is activated if when driving over a driving route in accordance with a driving plan, the exhaust purification catalyst was already heated on the driving route when driving over an EV section driven on by the EV mode and there is a CS section driven on by the CS mode in the remaining driving sections on the driving route. Specifically, it is configured to perform catalyst temperature raising control comprising control operating the internal combustion engine 10 for exactly a predetermined time.

In this way, according to the present embodiment, catalyst temperature raising control is performed during an EV section according to need only when there is a CS section driven on in the CS mode in the remaining driving sections on the driving route, so it is possible to keep fuel from ending up being wastefully consumed for raising the temperature of the catalyst regardless of the fact that the internal combustion engine 10 is not scheduled to be started up after the EV section. For this reason, it is possible to keep the fuel efficiency from deteriorating.

Further, even if driving sections set as EV sections successively continue and the time and distance of driving at the EV mode become long, it is possible to keep the temperature of the catalyst which has finished being heated at a CS section before the EV sections from falling to the activation temperature or less in the middle of the EV sections. For this reason, it is possible to keep the exhaust performance from deteriorating at a CS section after the EV sections. Furthermore, if the catalyst temperature falls to the activation temperature or less in the EV sections, it is necessary to again heat the catalyst in a subsequent CS section and necessary to heat the catalyst several times in one trip, but if like in the present embodiment operating the internal combustion engine 10 for exactly a predetermined time in the EV sections to maintain the catalyst temperature at a high temperature, it is possible to keep down the increase in the amount of fuel consumption due to the increase in the number of times of heating the catalyst.

Further, the CS mode in the present embodiment is a driving mode driving the hybrid vehicle by only the output of the second rotary electric machine 40 when the driving load is less than a switching load and driving the hybrid vehicle by both the outputs of the internal combustion engine 10 and second rotary electric machine 40 when the driving load is a switching load or more. The catalyst temperature raising control part is further configured to perform catalyst temperature raising control even when the temperature of the exhaust purification catalyst becomes less than a temperature raising reference temperature when the hybrid vehicle is driven by only the output of the second rotary electric machine 40 when driving over a CS section.

Due to this, when driving the vehicle 100 by just the output of the second rotary electric machine 40 during a CS section, it is possible to keep the catalyst temperature from ending up falling to the activation temperature or less. For this reason, during a CS section, when switching from a state driving the vehicle 100 by just the output of the second rotary electric machine 40 to a state driving the vehicle 100 by both the outputs of the internal combustion engine 10 and second rotary electric machine 40, it is possible to keep the exhaust performance from deteriorating.

Note that in the present embodiment, the catalyst temperature raising control part may also be configured so that catalyst temperature raising control is performed only when the driving load is a load enabling the internal combustion engine 10 to be operated by a predetermined heat efficiency or more or is a greater load. Due to this, it is possible to keep the internal combustion engine 10 from ending up being operated in a state of a poor heat efficiency so as to raise the catalyst temperature.

Second Embodiment

Next, a second embodiment of the present disclosure will be explained. The present embodiment differs in the content of the catalyst initial heating control and catalyst temperature raising control from the first embodiment. Below, this point of difference will be focused on in the explanation.

Figure 9:
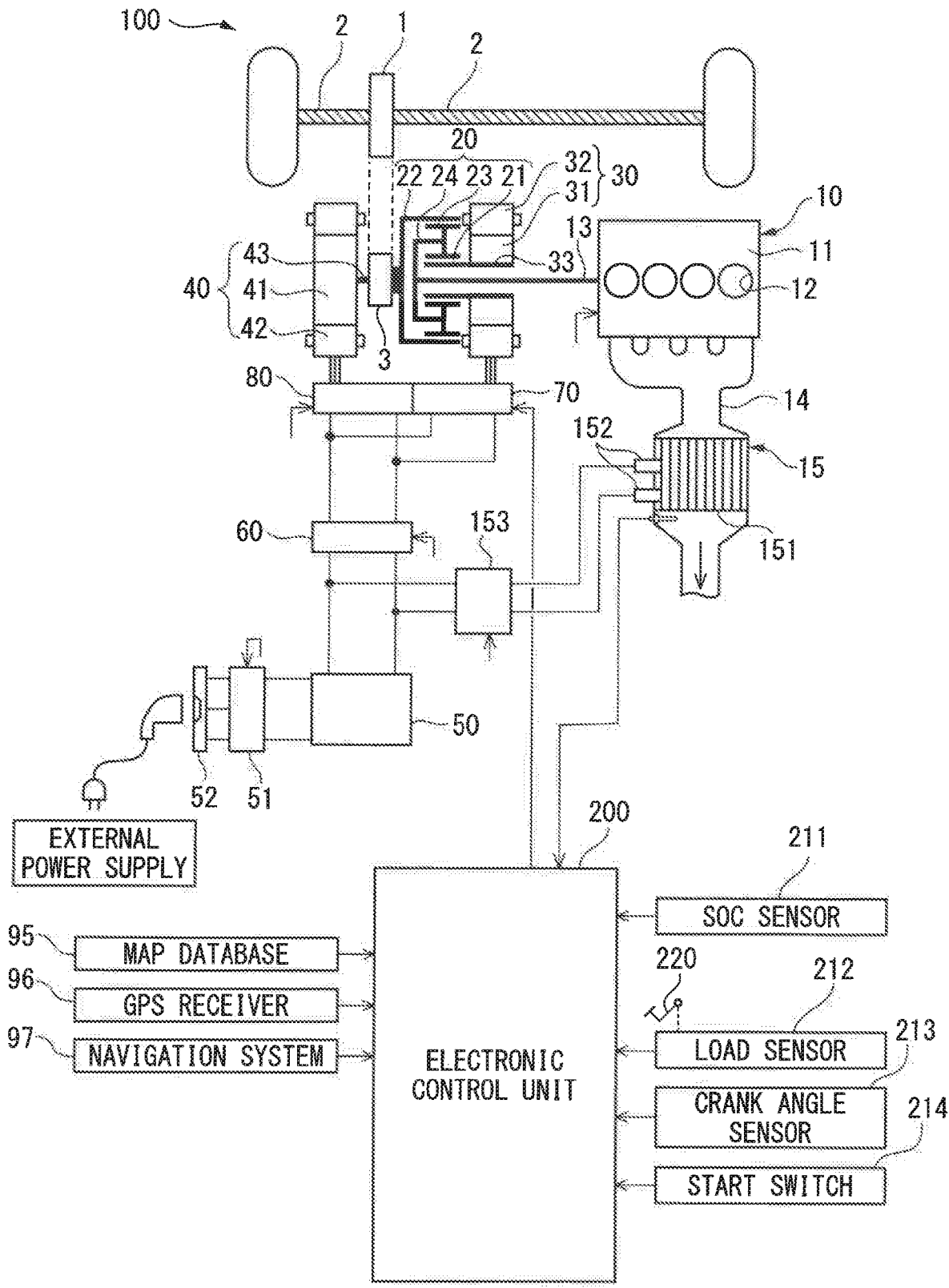
FIG. 9 is a schematic view of the configuration of a vehicle and an electronic control unit controlling the vehicle according to a second embodiment of the present disclosure.

FIG. 9 is a schematic view of the configuration of the vehicle 100 and the electronic control unit 200 controlling the vehicle 100 according to the second embodiment of the present disclosure.

As shown in FIG. 9, the catalyst device 15 of the internal combustion engine 10 according to the present embodiment is provided with a pair of electrodes 152 and a voltage adjustment circuit 153 so as to enable it to supply electric power to the substrate 151 to heat the substrate 151.

The substrate 151 according to the present embodiment, for example, is formed by a material which generates heat upon being energized such as silicon carbide (SiC) or molybdenum disilicide ($MoSi_2$).

The pair of electrodes 152 are respectively electrically connected to the substrate 151 in the electrically insulated state and are connected through the voltage adjustment circuit 153 to the battery 50. By supplying voltage through the pair of electrodes 152 to the substrate 151 to supply electric power to the substrate 151, current flows to the substrate 151, the substrate 151 is heated, and the catalyst supported on the substrate 151 is heated. The voltage supplied by the pair of electrodes 152 to the substrate 151 can be adjusted by using the electronic control unit 200 to control the voltage adjustment circuit 153. For example, it is possible to apply the voltage of the battery 50 as it is and possible to apply the voltage of the battery 50 lowered to any voltage.

Figure 10:
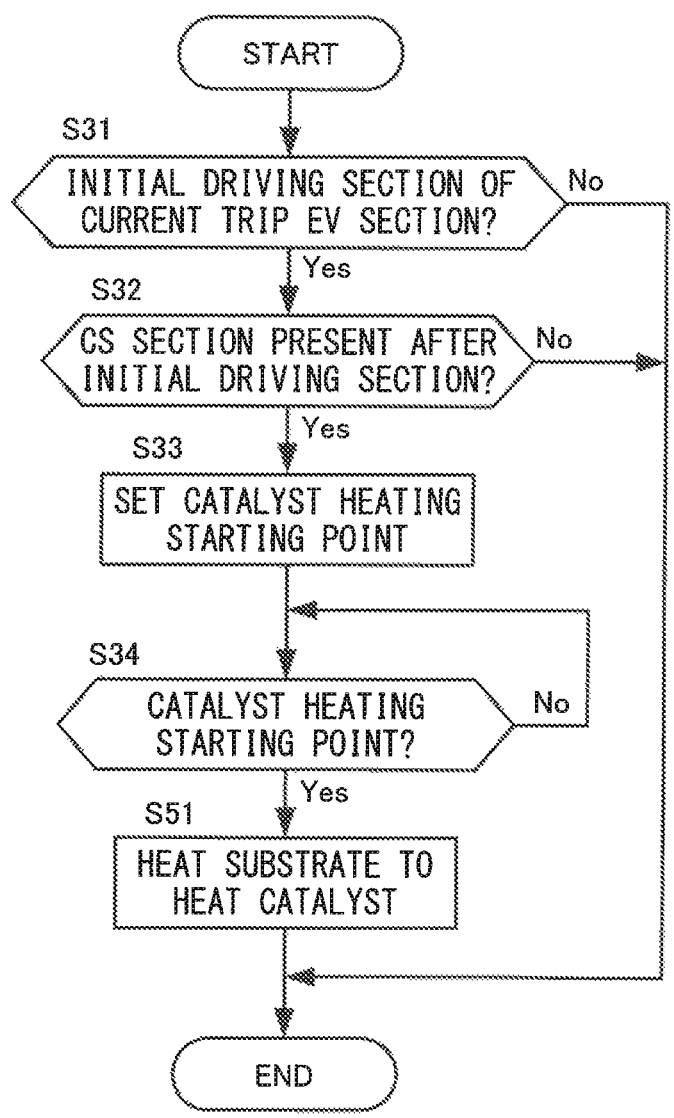
FIG. 10 is a flow chart explaining catalyst initial heating control according to the second embodiment of the present disclosure.

FIG. 10 is a flow chart explaining catalyst initial heating control according to the present embodiment. In FIG. 10, the content of the processing from step S31 to step S34 is basically content similar to the first embodiment, so here explanations will be omitted.

At step S51, the electronic control unit 200 supplies voltage through the pair of electrodes 152 to the substrate 151 so as to supply electric power to the substrate 151 and heat the substrate 151 to thereby initially heat the catalyst until a predetermined time or starting point of a CS section.

Figure 11:
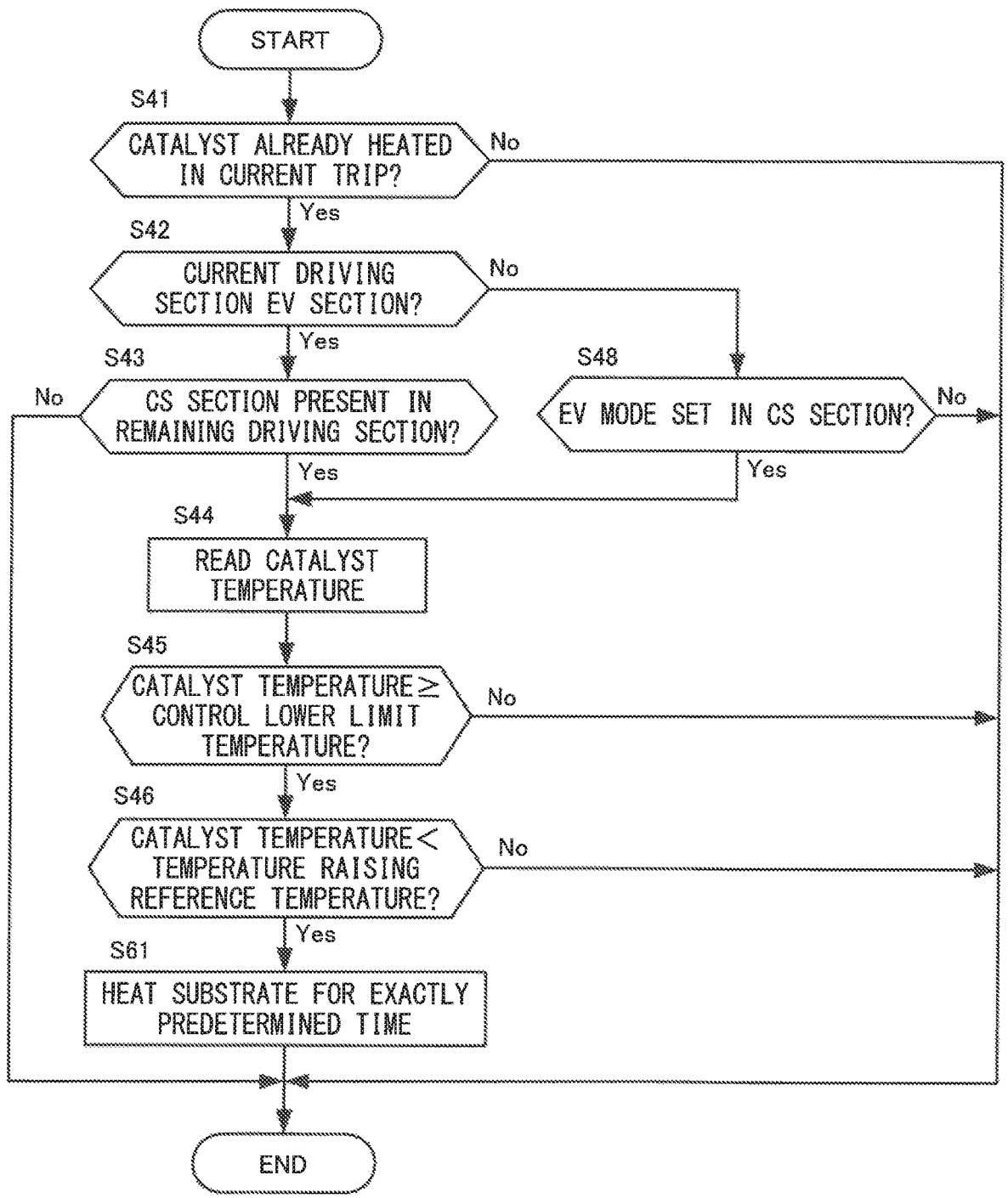
FIG. 11 is a flow chart explaining catalyst temperature raising control according to the second embodiment of the present disclosure.

FIG. 11 is a flow chart explaining the catalyst temperature raising control according to the present embodiment. In FIG. 11, the content of the processing from step S41 to step S46 is basically content similar to the first embodiment, so here explanations will be omitted.

At step S61, the electronic control unit 200 supplies voltage through the pair of electrodes 152 to the substrate 151 to supply electric power to the substrate 151 and heat the substrate 151 for exactly a predetermined time to thereby make the catalyst temperature rise. Note that, rather than heating the substrate 151 for exactly a predetermined time, it is also possible to heat the substrate 151 until the temperature of the substrate 151 becomes a predetermined temperature (for example, a temperature higher than the temperature raising reference temperature).

Even if like in the present embodiment explained above configuring the electronic control unit 200 so as to perform catalyst temperature raising control comprised of control supplying electric power to the substrate 151 to heat the substrate 151 for exactly a predetermined time, effects similar to the first embodiment can be obtained.

Third Embodiment

Next, a third embodiment of the present disclosure will be explained. The present embodiment differs from the above embodiments in the point of making part of the processing which had been performed by the electronic control unit 200 be performed by the server 300. Below, this point of difference will be focused on in the explanation.

FIG. 12 is a block diagram schematically showing the configuration of the vehicle 100 and the control device for controlling the vehicle 100 according to the third embodiment of the present disclosure.

The vehicle 100 according to the present embodiment is configured in the same way as the first embodiment, but as shown in FIG. 12, in the present embodiment, the control device for controlling the vehicle 100 is comprised of the electronic control unit 200 and the server 300. The electronic control unit 200 and the server 300 can communicate with each other through a network 400. Note that, the server 300 can communicate not only with the vehicle 100, but also with a plurality of other vehicles.

The server 300 is provided with a communication interface, central processing unit (CPU), random access memory (RAM) or other such memory, hard disk drive, etc. The server 300 runs programs etc. stored in the hard disk drive to prepare a driving plan, which had been prepared by the electronic control unit 200 in the first embodiment to the fourth embodiment, instead of the electronic control unit 200 and transmit it to the electronic control unit 200.

By preparing the driving plan by the server 300 instead of the electronic control unit 200 in this way, it is possible to reduce the processing load of the electronic control unit 200 and in turn possible to reduce the manufacturing costs of the electronic control unit 200.

Above, embodiments of the present disclosure were explained, but the above embodiments only show some of the examples of application of the present disclosure. It is not meant to limit the technical scope of the present disclosure to the specific constitutions of the above embodiments.

For example, in the above embodiments, as the vehicle 100, a plug-in hybrid vehicle configured so that its battery 50 can be electrically connected to an external power supply was explained as an example, but it may also be a regular hybrid vehicle.

Further, in the first embodiment, at step S36 of FIG. 5B, the driving routes up to the sorted route no. "k" were set to EV routes where all of the driving sections of the driving route are made EV sections, for the driving sections on the driving routes from the sorted route no. k+1 to the sorted route no. "n", the driving sections up to the second sorted section no. "k" were set to EV sections and the driving sections from the second sorted section no. k+1 to the second sorted section no. "n" were set to HV sections, and the driving sections were rearranged again in the order of the actual section numbers to thereby prepare a single second driving plan.

However, if, for example, at step S16, the sorted route no. "k" satisfying the inequality (2) is 2 or more, in the processing from step S17 to step S22, it is also possible to prepare a plurality of (sorted route no. "k" number of) second driving plans (route priority driving plan) as described below, employ the one among them with the smallest second total consumed fuel TF2 as the second driving plan, and compare this with the first total consumed fuel TF1 of the first driving plan at step S20.

Figure 13B:
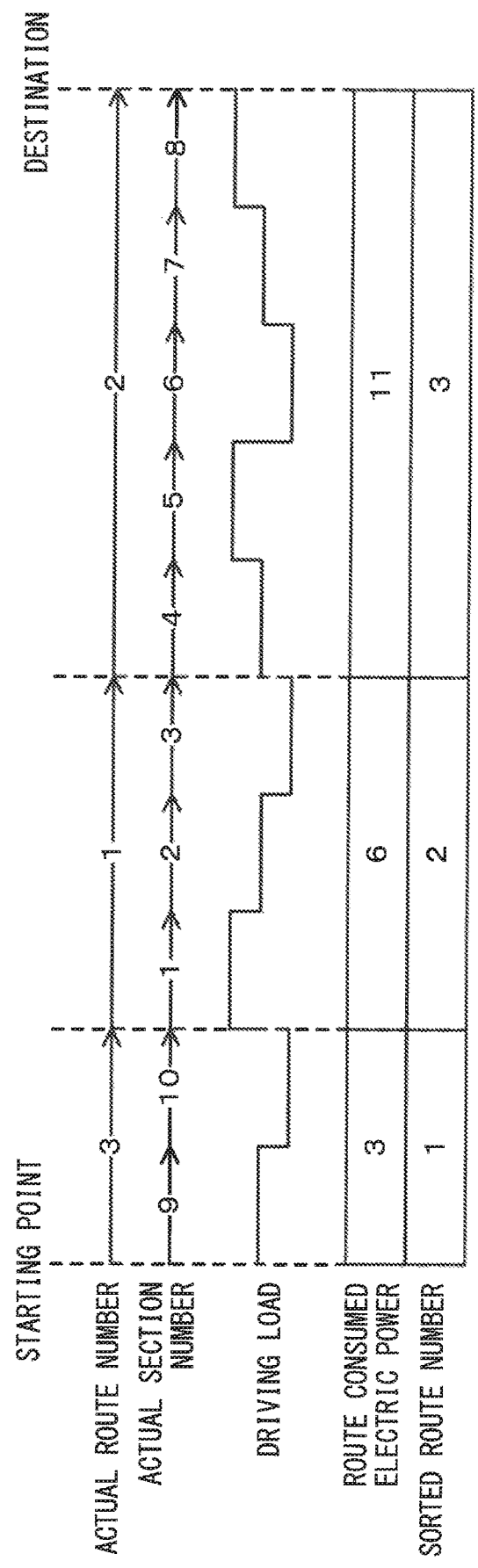
FIG. 13B is a view explaining preparation of a second driving plan according to a modification of the present disclosure optimizing a plurality of trips while considering an amount of fuel consumption for heating a catalyst.

For example, as shown in FIG. 13A, when considering the case where there are three driving routes (that is, two relay points), if performing the second sorting to rearrange the driving routes in the order of the smallest route consumed electric power and up, the result becomes as shown in FIG. 13B.

Figure 13D:
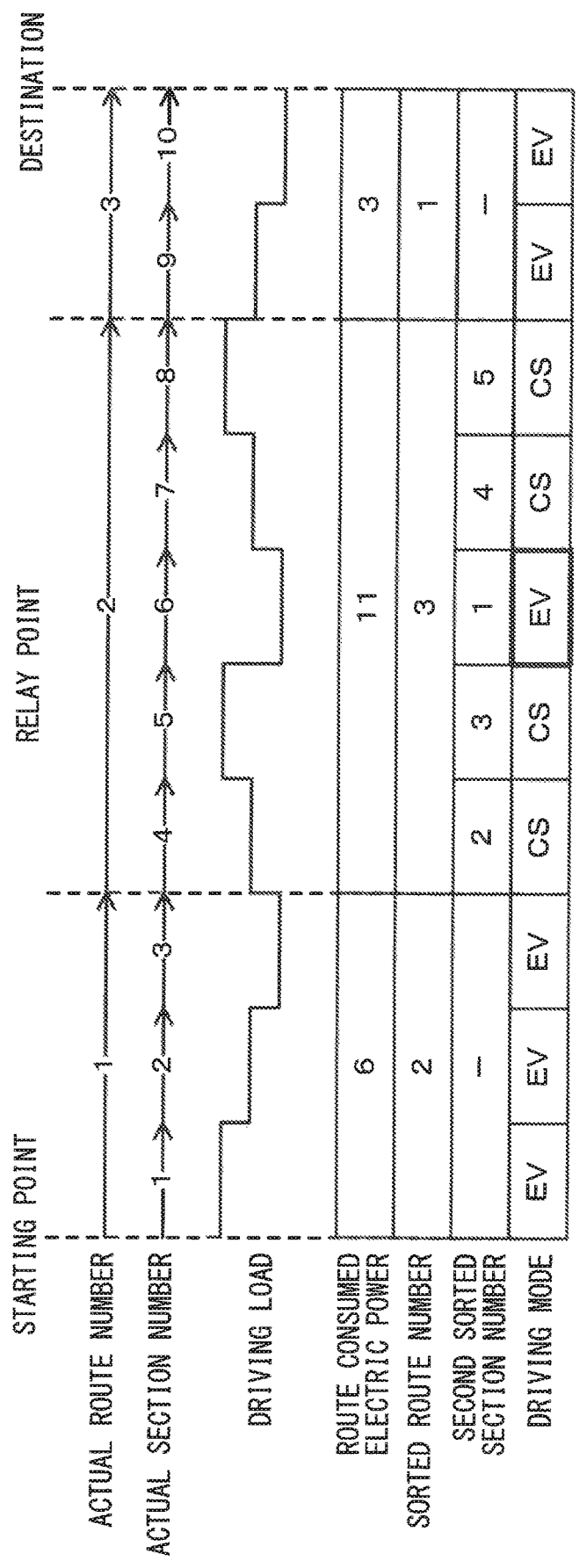
FIG. 13D is a view explaining preparation of a second driving plan according to a modification of the present disclosure optimizing a plurality of trips while considering an amount of fuel consumption for heating a catalyst.

At this time, for example, if the sorted route no. "k" satisfying the inequality (2) calculated at step S16 is 2, first, in the same way as the first embodiment, as shown in FIG. 13C, the driving routes up to the sorted route no. "k" (in the example shown in FIG. 13C, k=2) are set to EV routes with all driving sections on the driving routes made EV sections. Further, regarding the driving sections on the driving routes from the sorted route no. k+1 to the sorted route no. "n", considering the surplus electric power ΔCE of the battery (=CE−RE$_2$), the driving sections up to the second sorted section no. "k" able to be set as EV sections (in the example shown in FIG. 13C, k=1) are set to EV sections and the driving sections from the second sorted section no. k+1 to the second sorted section no. "n" (in the example shown in FIG. 13C, n=5) are set to HV sections. Further, as shown in FIG. 13D, this embodiment rearranges the driving sections in the order of the actual section numbers and sets these as a "first" second driving plan.

Figure 13E:
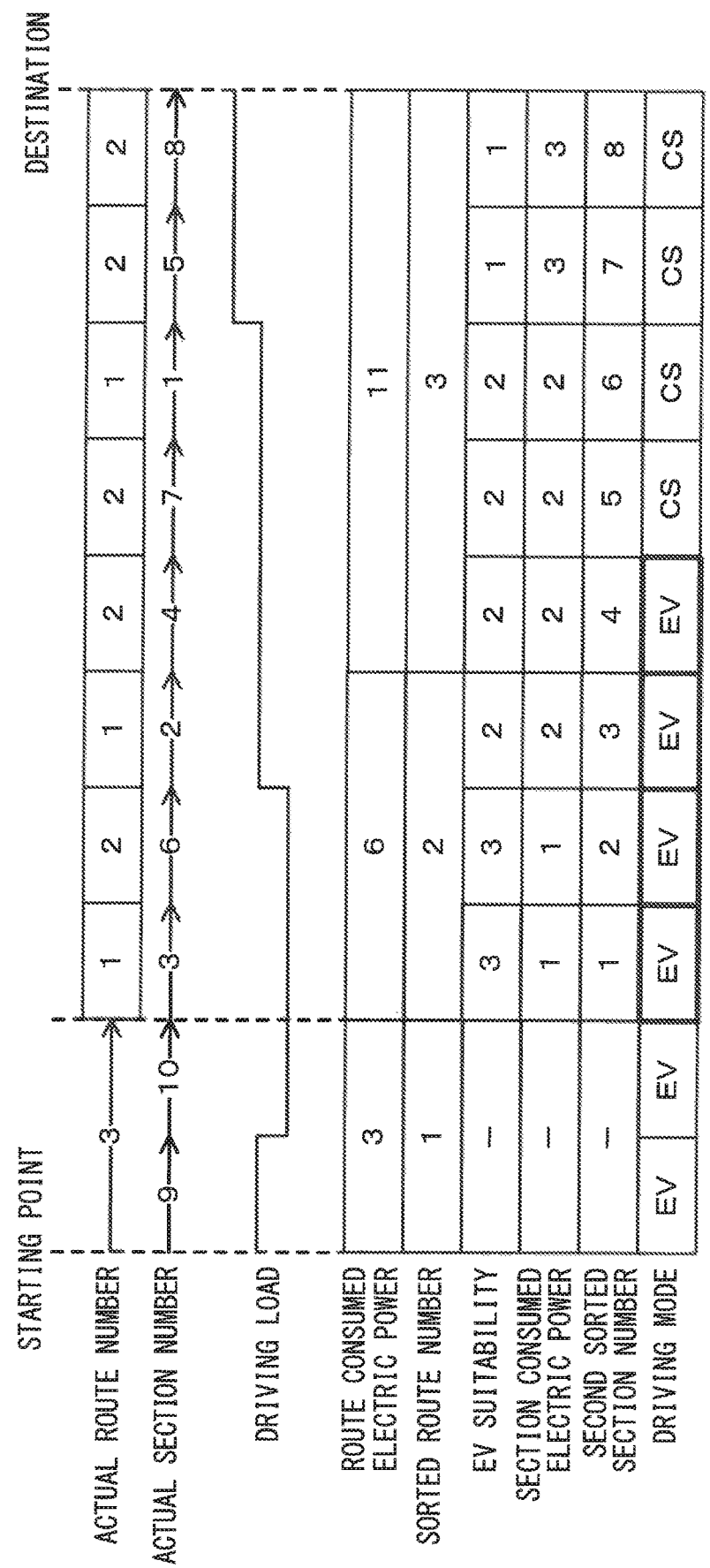
FIG. 13E is a view explaining preparation of a second driving plan according to a modification. of the present disclosure optimizing a plurality of trips while considering an amount of fuel consumption for heating a catalyst.
Figure 13F:
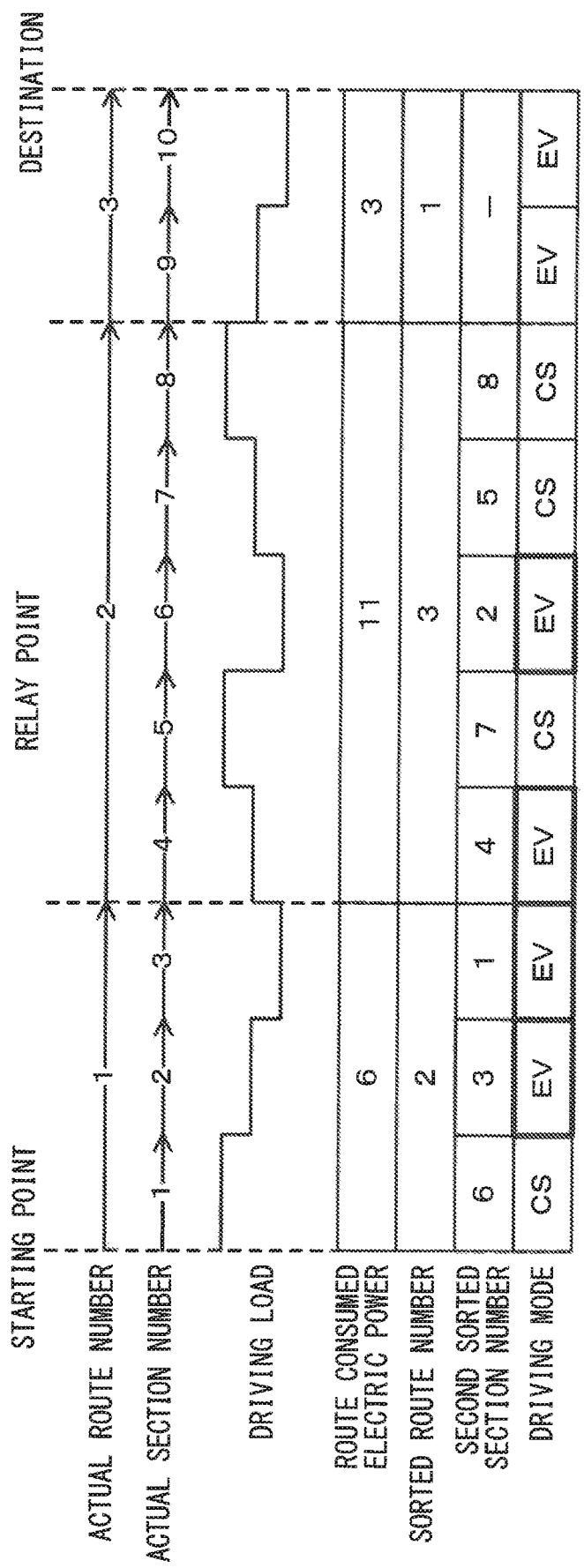
FIG. 13F is a view explaining preparation of a second driving plan according to a modification of the present disclosure optimizing a plurality of trips while considering an amount of fuel consumption for heating a catalyst.

Next, unlike the first embodiment, as shown in FIG. 13E, the driving route of the sorted route no. 1 is set to an EV route where all of the driving sections are made EV sections. Further, regarding the driving sections on the driving routes from the sorted route no. 2 to sorted route no. "n", considering the surplus electric power ΔCE of the battery (=CE−RE$_1$), the driving sections up to the second sorted section no. "k" able to be set as EV sections (in the example shown in FIG. 13E, k=4) are set to EV sections and the driving sections from the second sorted section no. k+1 to the second sorted section no. "n" (in the example shown in FIG. 13E, n=8) are set to HV sections. Further, as shown in FIG. 13F, this embodiment rearranges the driving sections in the order of the actual section numbers and sets these as a "second" second driving plan.

Further, it is also possible to calculate the second total consumed fuels TF2 of the second driving plans prepared in this way, employ the plan among them where the second total consumed fuel TF2 becomes the smallest as the second driving plan, and compared this with the first total consumed fuel TF1 of the first driving plan at step S20.

The invention claimed is:
1. A control device for a hybrid vehicle,
the hybrid vehicle comprising:
an internal combustion engine;
a rechargeable battery; and
a rotary electric machine driven by electric power of the rechargeable battery, wherein
the control device comprises an electronic control unit configured to:
prepare a driving plan dividing a driving route into a plurality of driving sections and setting whether to drive over each driving section by either a driving mode of an electric vehicle (EV) mode controlling an output of the rotary electric machine based on a driving load to operate the hybrid vehicle or a charge sustaining (CS) mode controlling an output of the internal combustion engine and the output of the rotary electric machine based on a state of charge of the rechargeable battery and the driving load to operate the hybrid vehicle;
switch the driving mode in accordance with the driving plan; and
perform catalyst temperature raising control making a temperature of an exhaust purification catalyst of the internal combustion engine rise,
wherein the electronic control unit is configured to perform the catalyst temperature raising control while driving in the EV mode on an EV section of the driving route when driving over the driving route in accordance with the driving plan, when, while driving on the EV section: (i) the temperature of the exhaust purification catalyst is less than a predetermined temperature raising reference temperature that is higher than an activation temperature at which an exhaust purification function of the exhaust purification catalyst is activated, (ii) the exhaust purification catalyst was previously heated while driving on the driving route, and (iii) there is a CS section to be driven on while in the CS mode in a remaining driving section of the driving route after the EV section.

2. The control device according to claim 1, wherein
the CS mode is a driving mode in which the hybrid vehicle is driven by only the output of the rotary electric machine when the driving load is less than a switching load and in which the hybrid vehicle is driven by both the output of the internal combustion engine and the output of the rotary electric machine when the driving load is equal to or greater than the switching load, and
the electronic control unit is further configured to perform the catalyst temperature raising control when driving over the CS section when driving the hybrid vehicle by only the output of the rotary electric machine when the temperature of the exhaust purification catalyst becomes less than the predetermined temperature raising reference temperature.

3. The control device according to claim 2, wherein the electronic control unit is further configured to change the switching load so that as the state of charge of the rechargeable battery decreases, the switching load is decreased.

4. The control device according to claim 1, wherein the catalyst temperature raising control makes the internal combustion engine operate for exactly a predetermined time.

5. The control device according to claim 4, wherein the electronic control unit is further configured to perform the catalyst temperature raising control only when the driving load is equal to or greater than a load enabling the internal combustion engine to be operated at a heat efficiency that is equal to or greater than a predetermined heat efficiency.

6. The control device according to claim 1, wherein the catalyst temperature raising control supplies electric power to a substrate supporting the exhaust purification catalyst at a surface of the exhaust purification catalyst to heat the substrate for exactly a predetermined time or to heat the substrate until a temperature of the substrate becomes equal to or greater than a predetermined temperature.

* * * * *